(12) United States Patent
Tsuji et al.

(10) Patent No.: US 11,292,484 B2
(45) Date of Patent: Apr. 5, 2022

(54) VEHICLE CONTROL DEVICE, VEHICLE, AND VEHICLE CONTROL METHOD

(71) Applicant: HONDA MOTOR CO., LTD., Tokyo (JP)

(72) Inventors: Kanta Tsuji, Wako (JP); Yuta Takada, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 106 days.

(21) Appl. No.: 16/783,718

(22) Filed: Feb. 6, 2020

(65) Prior Publication Data
US 2020/0255022 A1 Aug. 13, 2020

(30) Foreign Application Priority Data
Feb. 7, 2019 (JP) .............................. JP2019-020218

(51) Int. Cl.
*B60W 50/10* (2012.01)
*B62D 15/02* (2006.01)
*B60W 30/18* (2012.01)
*B60W 50/14* (2020.01)

(52) U.S. Cl.
CPC ...... *B60W 50/10* (2013.01); *B60W 30/18163* (2013.01); *B60W 50/14* (2013.01); *B62D 15/0255* (2013.01); *B60W 2540/18* (2013.01); *B60W 2540/215* (2020.02); *B60W 2720/10* (2013.01)

(58) Field of Classification Search
CPC ................................................ B60W 30/18163
See application file for complete search history.

(56) References Cited

U.S. PATENT DOCUMENTS

| 2010/0152952 A1* | 6/2010 | Lee ........................ B62D 1/286 701/31.4 |
| 2018/0345959 A1* | 12/2018 | Fujii ............... B60W 30/18163 |
| 2018/0354517 A1* | 12/2018 | Banno .................. B60W 50/14 |

FOREIGN PATENT DOCUMENTS

| JP | 2016-071514 A | 5/2016 |
| JP | 2017-102519 A | 6/2017 |

* cited by examiner

*Primary Examiner* — Imran K Mustafa
(74) *Attorney, Agent, or Firm* — Carrier Blackman & Associates, P.C.; Joseph P. Carrier; Jeffrey T. Gedeon

(57) ABSTRACT

A vehicle control device includes an operation detection unit detecting an operation input to an operation input unit capable of being used when increasing or decreasing a travel speed of a host vehicle, when initiating a following control with respect to a preceding vehicle, or when reinitiating the following control with respect to the preceding vehicle, and a lane change control unit performing a lane change control based on the operation input detected by the operation detection unit. In the case that a first operation input is performed, the lane change control unit performs a lane change into a first lane located on one side of a host vehicle lane where the host vehicle is traveling, whereas in the case that a second operation input is performed, the lane change control unit performs a lane change into a second lane located on another side of the host vehicle lane.

15 Claims, 15 Drawing Sheets

VEHICLE CONTROL DEVICE, VEHICLE, AND VEHICLE CONTROL METHOD

CROSS-REFERENCE TO RELATED APPLICATION

This application is based upon and claims the benefit of priority from Japanese Patent Application No. 2019-020218 filed on Feb. 7, 2019, the contents of which are incorporated herein by reference.

BACKGROUND OF THE INVENTION

Field of the Invention

The present invention relates to a vehicle control device, a vehicle, and a vehicle control method.

Description of the Related Art

Recently, vehicle control devices have been proposed which are capable of carrying out a lane change control. In Japanese Laid-Open Patent Publication No. 2017-102519, it is disclosed to detect that a driver has permitted the vehicle to make a lane change, on the basis of an operation input made by the driver to a predetermined operating member.

SUMMARY OF THE INVENTION

However, the proposed vehicle control device is not capable of always realizing sufficiently suitable operability.

An object of the present invention is to provide a vehicle control device, a vehicle, and a vehicle control method having suitable operability.

A vehicle control device according to one aspect of the present invention comprises an operation detection unit configured to detect an operation input performed by a user to an operation input unit configured to be used when increasing or decreasing a travel speed of a host vehicle, when initiating a following control with respect to a preceding vehicle, or when reinitiating the following control with respect to the preceding vehicle, and a lane change control unit configured to carry out a lane change control on a basis of the operation input detected by the operation detection unit, wherein a first operation input and a second operation input are configured to be performed to the operation input unit, the second operation input being performed in a different operating position or in a different operating direction from the first operation input, and in a case that the first operation input is performed, the lane change control unit carries out the lane change into a first lane located on one side of a host vehicle lane which is a lane in which the host vehicle is traveling, whereas in a case that the second operation input is performed, the lane change control unit carries out the lane change into a second lane located on another side of the host vehicle lane.

A vehicle according to another aspect of the present invention comprises the vehicle control device as described above.

A vehicle control method according to another aspect of the present invention comprises a step of detecting an operation input performed by a user to an operation input unit configured to be used when increasing or decreasing a travel speed of a host vehicle, when initiating a following control with respect to a preceding vehicle, or when reinitiating the following control with respect to the preceding vehicle, and a step of carrying out a lane change control on a basis of the operation input, wherein a first operation input and a second operation input are configured to be performed to the operation input unit, the second operation input being performed in a different operating position or in a different operating direction from the first operation input, and in the step of carrying out the lane change control, in a case that the first operation input is performed, the lane change is carried out into a first lane located on one side of a host vehicle lane which is a lane in which the host vehicle is traveling, whereas in a case that the second operation input is performed, the lane change is carried out into a second lane located on another side of the host vehicle lane.

According to the present invention, it is possible to provide a vehicle control device, a vehicle, and a vehicle control method having suitable operability.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a vehicle control device, a vehicle, and a vehicle control method according to the present invention will be presented and described in detail below with reference to the accompanying drawings.

First Embodiment

Figure 1:
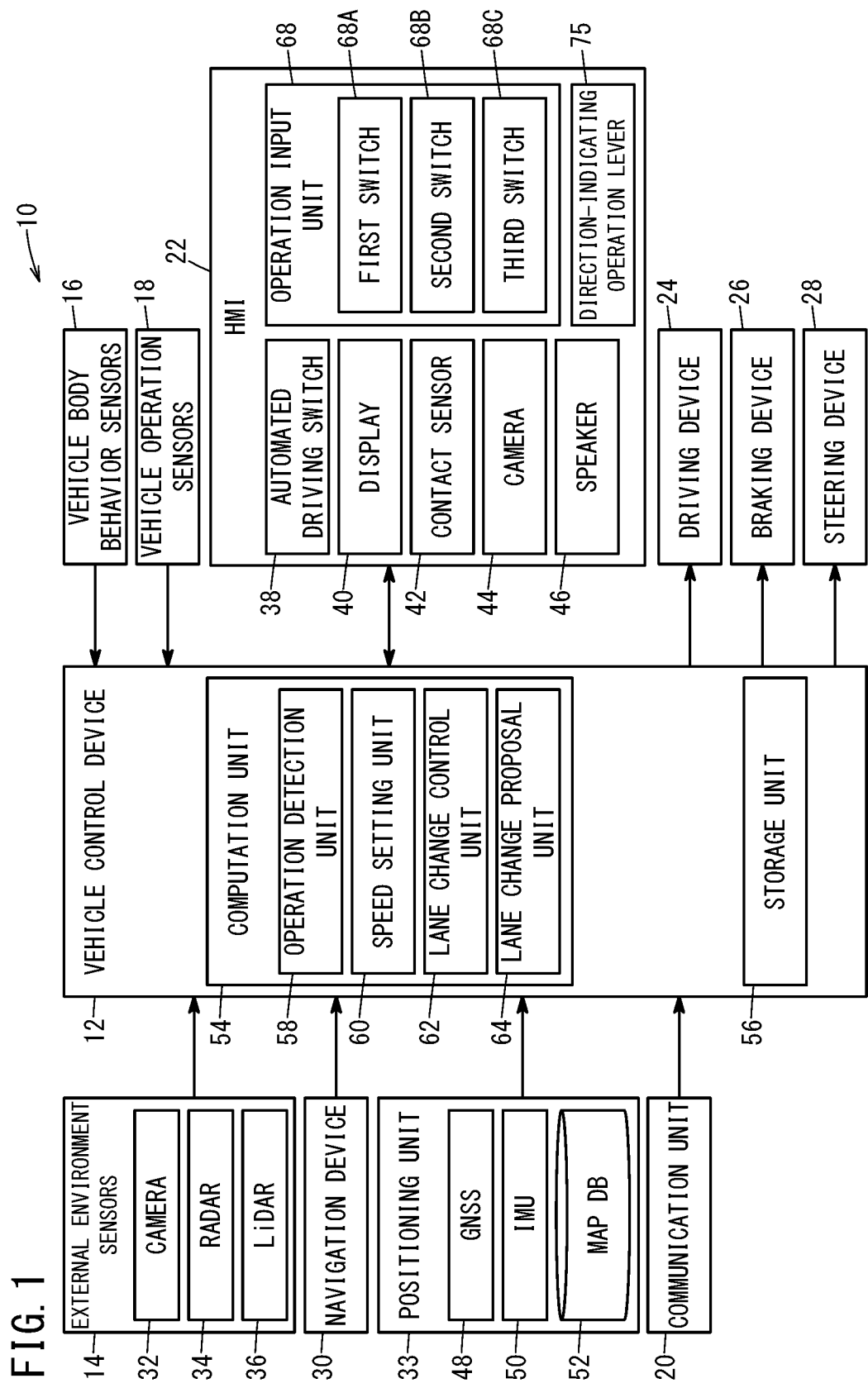
FIG. 1 is a block diagram showing a vehicle according to a first embodiment.

A vehicle control device, a vehicle, and a vehicle control method according to a first embodiment will be described with reference to the drawings. FIG. 1 is a block diagram showing a vehicle according to the present embodiment.

The vehicle (host vehicle) 10 is equipped with a vehicle control device 12, namely, a vehicle control ECU (Electronic Control Unit). The vehicle 10 is further equipped with external environment sensors 14, vehicle body behavior sensors 16, vehicle operation sensors 18, a communication unit 20, and an HMI (Human Machine Interface) 22. The vehicle 10 is further equipped with a driving device 24, a braking device 26, a steering device 28, a navigation device 30, and a positioning unit 33. Although the vehicle 10 is equipped with other constituent elements apart from those noted above, description of such elements is omitted herein.

The external environment sensors 14 acquire external environmental information, that is, peripheral information around the vicinity of the vehicle 10. The external environment sensors 14 include a plurality of cameras 32 and a plurality of radar devices 34. Among the external environment sensors 14, there are further included a plurality of LiDAR (Light Detection And Ranging, Laser Imaging Detection and Ranging) devices 36.

Information acquired by cameras (imaging units) 32, i.e., camera information, is supplied from the cameras 32 to the vehicle control device 12. As such camera information, there may be cited captured image information and the like. The camera information, together with radar information and LiDAR information to be described later, makes up the external environmental information. Although a single camera 32 is illustrated in FIG. 1, a plurality of cameras 32 are actually provided.

The radar devices 34 emit transmitted waves toward the exterior of the vehicle 10, and receive reflected waves that are reflected and returned by detected objects. As examples of the transmitted waves, there may be cited electromagnetic waves. As examples of the electromagnetic waves, there may be cited millimeter waves. As examples of the detected objects, there may be cited another vehicle 76 or the like including a preceding vehicle (see FIG. 4). The radar devices 34 generate radar information (reflected wave signals) based on the reflected waves or the like. The radar devices 34 supply the generated radar information to the vehicle control device 12. Although one radar device 34 is illustrated in FIG. 1, a plurality of radar devices 34 are actually provided in the vehicle 10. Moreover, the radar devices 34 are not limited to using millimeter wave radar. For example, laser radar devices, or ultrasonic sensors or the like may be used as the radar devices 34.

The LiDAR devices 36 continuously irradiate lasers in all directions of the vehicle 10, measure the three-dimensional position of reflection points based on reflected waves of the emitted lasers, and output information, i.e., three dimensional information, in relation to the three-dimensional positions. The LiDAR devices 36 supply the three-dimensional information, i.e., LiDAR information, to the vehicle control device 12. Although one LiDAR device 36 is illustrated in FIG. 1, a plurality of LiDAR devices 36 are actually provided in the vehicle 10.

The vehicle body behavior sensors 16 acquire information, namely, vehicle body behavior information, in relation to the behavior of the vehicle 10. The vehicle body behavior sensors 16 include a non-illustrated vehicle speed sensor, non-illustrated vehicle wheel speed sensors, a non-illustrated acceleration sensor, and a non-illustrated yaw rate sensor. The vehicle speed sensor detects the speed, i.e., the vehicle speed, of the vehicle 10. Further, the vehicle speed sensor detects the direction in which the vehicle 10 is traveling. The vehicle wheel speed sensors detect the speed, i.e., the vehicle wheel speed, of the non-illustrated vehicle wheels. The acceleration sensor detects the acceleration of the vehicle 10. The term "acceleration" includes a longitudinal acceleration, a lateral acceleration, and a vertical acceleration. It should be noted that the acceleration of only a portion of the aforementioned directions may be detected by the acceleration sensor. The yaw rate sensor detects a yaw rate of the vehicle 10.

The vehicle operation sensors (driving operation sensors) 18 acquire information, namely, driving operation information, in relation to driving operations made by a user (driver). The vehicle operation sensors 18 include a non-illustrated accelerator pedal sensor, a non-illustrated brake pedal sensor, a non-illustrated steering angle sensor, and a non-illustrated steering torque sensor. The accelerator pedal sensor detects an operated amount of a non-illustrated accelerator pedal. The brake pedal sensor detects an operated amount of a non-illustrated brake pedal. The steering angle sensor detects the steering angle of a steering wheel 74 (see FIG. 2). The torque sensor detects a torque applied to the steering wheel 74.

The communication unit 20 performs wireless communications with non-illustrated external equipment. The external equipment may include, for example, a non-illustrated external server. The communication unit 20 may be capable of being detached from the vehicle 10, or may be non-detachable with respect to the vehicle. As examples of the communication unit 20 which can be attached to and detached from the vehicle 10, there may be cited a mobile phone and a smartphone.

The HMI 22 receives an operation input made by the user (vehicle occupant), and provides various types of information to the user in a visual, audible, or tactile manner. The HMI 22 includes, for example, an automated driving switch (driving assist switch) 38, a display 40, a contact sensor 42, a camera 44, a speaker 46, an operation input unit 68, and a direction-indicating operation lever 75.

The automated driving switch 38 is used by the user in order to instruct starting or stopping of automated driving. The automated driving switch 38 includes a non-illustrated start switch and a non-illustrated stop switch. The start switch outputs a start signal to the vehicle control device 12 in accordance with an operation of the user. The stop switch outputs a stop signal to the vehicle control device 12 in accordance with an operation of the user.

The display (display unit) 40 includes, for example, a liquid crystal panel or an organic EL panel or the like. In this instance, although an exemplary case will be described in which the display 40 is a touch panel, the present invention is not limited to this feature.

The contact sensor 42 serves to detect whether or not the user (driver) is touching the steering wheel 74. Signals output from the contact sensor 42 are supplied to the vehicle control device 12. On the basis of input signals supplied from the contact sensor 42, the vehicle control device 12 is capable of determining whether or not the user is touching the steering wheel 74.

The camera 44 captures images of the interior, i.e., a non-illustrated vehicle compartment interior, of the vehicle 10. The camera 44 may be disposed, for example, on a non-illustrated dashboard, or may be disposed on a non-illustrated ceiling of the vehicle 10. Further, the camera 44 may be disposed in a manner so that images are captured of only the driver, or may be disposed in a manner so that images are captured of each of the vehicle occupants. The camera 44 outputs information, i.e., image information, which is acquired by capturing images of the vehicle compartment interior, to the vehicle control device 12.

The speaker 46 serves to provide various types of information to the user by way of sound or voice. The vehicle control device 12 outputs various notifications, alarms, or the like using the speaker 46.

The operation input unit 68 can be used, for example, when increasing or decreasing the travel speed of the vehicle 10. The operation input unit 68, for example, is made up of buttons, namely, adaptive cruise control buttons, which are used for the purpose of setting an adaptive cruise control. Such an adaptive cruise control functions so as to maintain the travel speed of the host vehicle 10 at a predetermined travel speed (set travel speed), while keeping the inter-vehicle distance constant even in the case that the accelerator pedal is not depressed by the user. Stated otherwise, the adaptive cruise control is a function that is capable of performing a following control with respect to a preceding vehicle 76.

Figure 2:
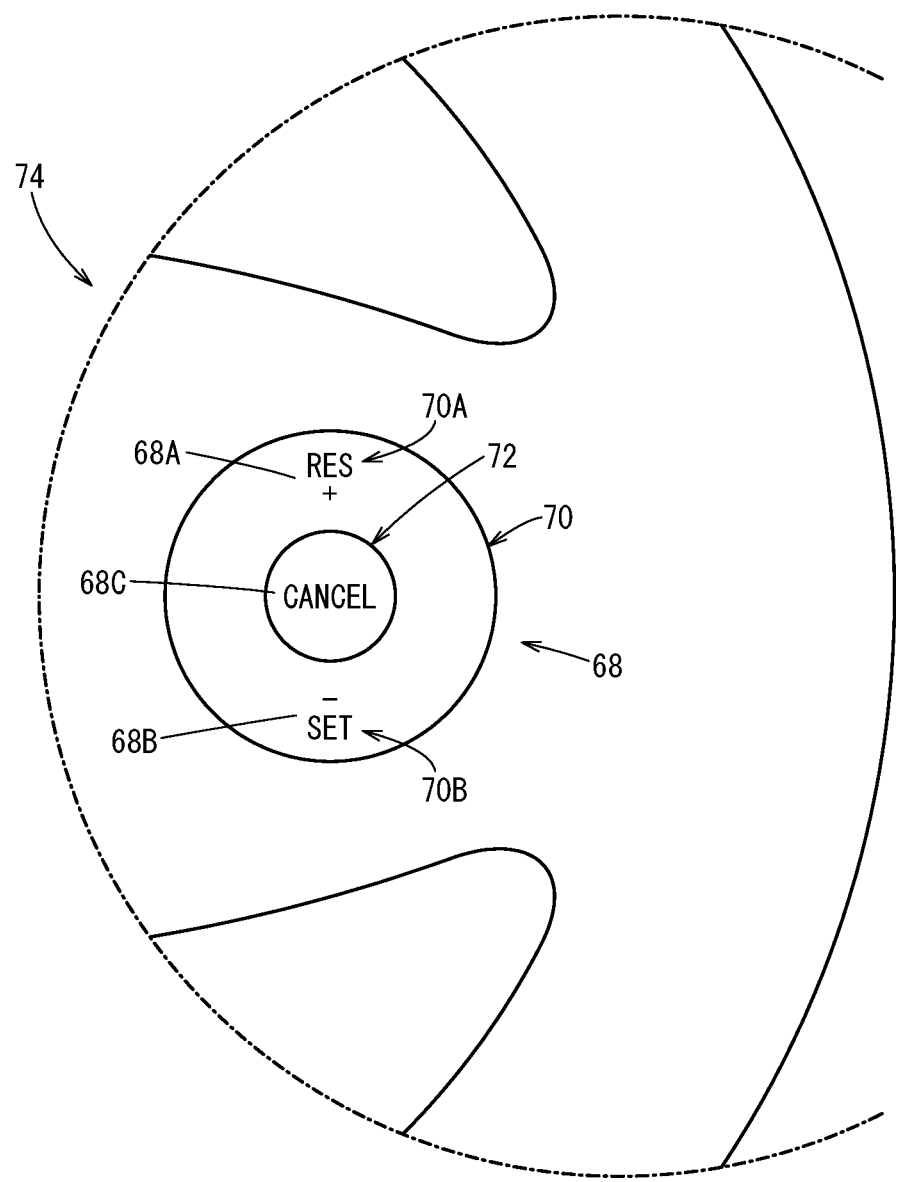
FIG. 2 is a diagram illustrating an example of an operation input unit provided in the vehicle according to the first embodiment.

FIG. 2 is a diagram illustrating an example of an operation input unit provided in the vehicle according to the present embodiment. The operation input unit 68 is provided, for example, on the steering wheel 74. The operation input unit 68 includes, for example, a ring-shaped push button 70 and a circular push button 72. The push button 70 is positioned in surrounding relation to the push button 72. The operation input unit 68 is equipped with a first switch 68A (see FIG. 1), a second switch 68B (see FIG. 1), and a third switch 68C (see FIG. 1). The upper portion within the push button 70 is a first input unit 70A. When the first input unit 70A is pressed, the first switch 68A is placed in an ON state. The lower portion within the push button 70 is a second input unit 70B. When the second input unit 70B is pressed, the second switch 68B is placed in an ON state. When the push button 72 is pressed, the third switch 68C is placed in an ON state. The first switch 68A, for example, is a resume switch. The second switch 68B, for example, is a set switch. The third switch 68C, for example, is a cancel switch. In the case that the second input unit 70B is pressed when the travel speed of the host vehicle 10 is greater than or equal to a predetermined speed, and the brake pedal is not being operated, a computation unit 54 performs the following control. More specifically, the computation unit 54 sets the current travel speed of the host vehicle 10 as the set travel speed, and activates the adaptive cruise control. Stated otherwise, in such a case, the computation unit 54 initiates a following control with respect to the preceding vehicle 76. In the case that the preceding vehicle 76 is not present, the computation unit 54 executes traveling on the basis of the set travel speed. In the case that the brake pedal is operated in a state in which the adaptive cruise control is activated, the computation unit 54 causes the adaptive cruise control to transition into a standby state. In the case that the push button 72 is operated in a state in which the adaptive cruise control is activated, the computation unit 54 causes the adaptive cruise control to transition into the standby state. In the case that the push button 72 is pressed in a state in which the adaptive cruise control is activated, and a lane change proposal is being issued by a lane change proposal unit 64, the computation unit 54 performs the following control. More specifically, in such a case, the computation unit 54 causes the adaptive cruise control to transition into the standby state, together with terminating the lane change proposal. In the case that the push button 72 is pressed in a state in which the adaptive cruise control is activated, and a lane change is being executed corresponding to the lane change proposed by the lane change proposal unit 64, the computation unit 54 performs the following control. More specifically, in such a case, the computation unit 54 causes the adaptive cruise control to transition into the standby state, together with suspending the lane change. In the case that the first input unit 70A is pressed, the computation unit 54 refers to the previously set travel speed, and reinitiates the adaptive cruise control. Stated otherwise, in such a case, the computation unit 54 reinitiates the following control with respect to the preceding vehicle 76 at the previously set travel speed. The operation input unit 68 supplies signals, which are indicative of operation states set with respect to the first switch 68A, the second switch 68B, and the third switch 68C, to a later-described operation detection unit 58.

Figure 3:
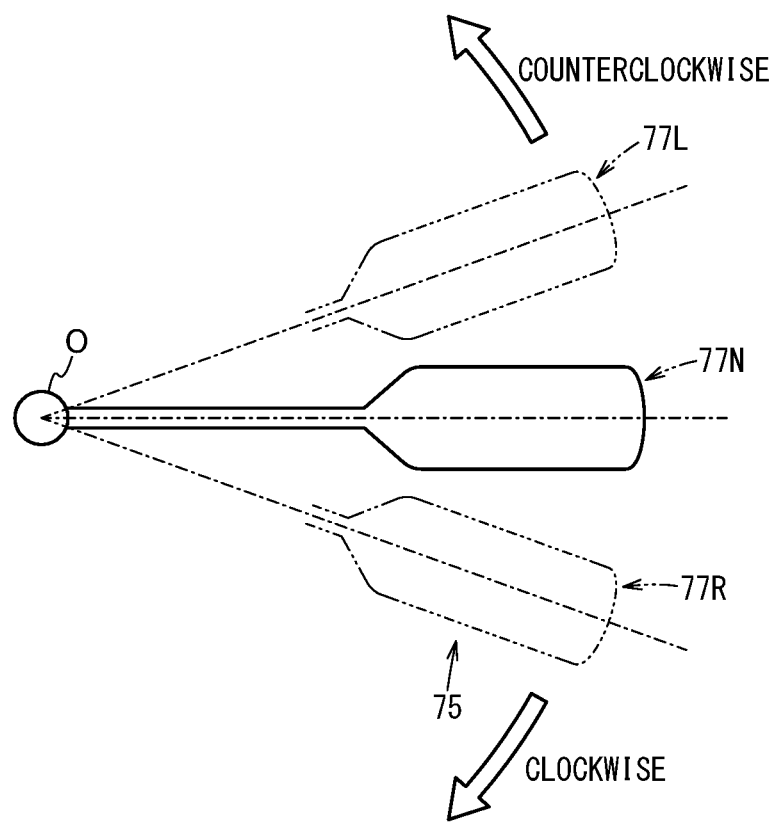
FIG. 3 is a diagram illustrating an example of a direction-indicating operation lever.

The direction-indicating operation lever 75 is disposed in a manner so as to protrude toward the right side from a non-illustrated steering column. FIG. 3 is a diagram illustrating an example of the direction-indicating operation lever. The direction-indicating operation lever 75 can be turned clockwise and counterclockwise about a support shaft O. The direction-indicating operation lever 75 can be set to a neutral position 77N, an operating position 77L, and an operating position 77R. The operating position 77L is a position turned counterclockwise from the neutral position 77N by a predetermined stroke amount. The operating position 77R is a position turned clockwise from the neutral position 77N by a predetermined stroke amount. The direction-indicating operation lever 75 is equipped with a non-illustrated operating position sensor. The operating position sensor detects whether the operating position of the direction-indicating operation lever 75 is any one from among the neutral position 77N, the operating position 77L, and the operating position 77R. The direction-indicating operation lever 75 supplies to the vehicle control device 12 information obtained by the operating position sensor, and more specifically, information concerning the operating position of the direction-indicating operation lever 75.

The driving device (driving force control system) 24 includes a non-illustrated drive ECU, and a non-illustrated drive source. By controlling the drive source, the drive ECU controls the driving force (torque) of the vehicle 10. As examples of the drive source, there may be cited an engine or a drive motor. The drive ECU is capable of controlling the driving force by controlling the drive source, based on an operation made by the user on the accelerator pedal. Further, the drive ECU is capable of controlling the driving force by controlling the drive source, based on a command supplied from the vehicle control device 12. The driving force of the drive source is transmitted to the non-illustrated vehicle wheels via a non-illustrated transmission.

The braking device (braking force control system) 26 includes a non-illustrated brake ECU, and a non-illustrated brake mechanism. The brake mechanism actuates a brake member by a brake motor, a hydraulic mechanism, or the like. The brake ECU is capable of controlling the braking force by controlling the brake mechanism, based on an operation made by the user on the brake pedal. Further, the brake ECU is capable of controlling the braking force by controlling the brake mechanism, based on a command supplied from the vehicle control device 12.

The steering device (steering system) 28 includes a non-illustrated steering ECU, and more specifically, an EPS (electric power steering system) ECU, and a non-illustrated steering motor. The steering ECU controls the direction of the vehicle wheels (steering wheels) by controlling the steering motor, based on an operation made by the user on the steering wheel 74. Further, the steering ECU controls the direction of the vehicle wheels by controlling the steering motor, based on a command supplied from the vehicle control device 12. Steering may be performed by changing the torque distribution and the braking force distribution to the left and right vehicle wheels.

The navigation device 30 is equipped with a non-illustrated GNSS (Global Navigation Satellite System) sensor. In addition, the navigation device 30 is further equipped with a non-illustrated computation unit and a non-illustrated storage unit. The GNSS sensor detects the current position of the vehicle 10. From a map database stored in the storage unit, the computation unit reads out map information corresponding to the current position detected by the GNSS sensor. Using the map information, the computation unit determines a target route from the current position to a destination. The destination is input by the user via the HMI 22. As described above, the display 40 is a touch panel. The destination is input by the touch panel being operated by the user. The navigation device 30 outputs the created target route to the vehicle control device 12. The vehicle control device 12 supplies the target route to the HMI 22. The HMI 22 displays the target route on the display 40.

The positioning unit 33 is equipped with a GNSS 48. The positioning unit 33 is further provided with an IMU (Inertial Measurement Unit) 50 and a map database (map DB) 52. The positioning unit 33 specifies the position of the vehicle 10 by appropriately using the information obtained by the GNSS 48, the information obtained by the IMU 50, and the map information stored in the map database 52. The positioning unit 33 is capable of supplying host vehicle position information, which is information indicative of the position of the host vehicle 10, to the vehicle control device 12. Further, the positioning unit 33 is capable of supplying the map information to the vehicle control device 12.

The vehicle control device 12 is equipped with the computation unit 54 and a storage unit 56. The computation unit 54 governs the overall control of the vehicle control device 12. The computation unit 54 is constituted, for example, by a CPU (Central Processing Unit). The computation unit 54 executes the vehicle control by controlling each of the respective units based on programs stored in the storage unit 56.

The computation unit 54 is equipped with the operation detection unit 58, a speed setting unit 60, and a lane change control unit 62. The operation detection unit 58, the speed setting unit 60, and the lane change control unit 62 can be realized by the computation unit 54 executing programs which are stored in the storage unit 56.

On the basis of signals supplied from the operation input unit 68, the operation detection unit 58 detects operation inputs performed by the user to the operation input unit 68. As described above, the signals supplied from the operation input unit 68 are signals indicative of whether each of the first switch 68A, the second switch 68B, and the third switch 68C have been placed in an ON state or an OFF state.

The operation detection unit 58 can determine whether the operation input performed by the user to the operation input unit 68 is an operation input for a predetermined time period or longer. The predetermined time period can be, for example, on the order of two seconds, but is not limited to such a duration. When an operation input to the first input unit 70A for the predetermined time period or longer is performed by the user, the operation detection unit 58 determines that the operation input is the first operation input. The first operation input is a long-pressing operation made with respect to the first input unit 70A for the predetermined time period or longer. When an operation input to the second input unit 70B for the predetermined time period or longer is performed by the user, the operation detection unit 58 determines that the operation input is the second operation input. The second operation input is a long-pressing operation made with respect to the second input unit 70B for the predetermined time period or longer. In this manner, the operation detection unit 58 is capable of detecting the first operation input, and the second operation input performed in a different operating position from the first operation input. Moreover, in this instance, although an exemplary case has been described in which the first operation input is a long-pressing operation made with respect to the first input unit 70A for the predetermined time period or longer, and the second operation input is a long-pressing operation made with respect to the second input unit 70B for the predetermined time period or longer, the present invention is not necessarily limited to this feature. The first operation input may be a predetermined degree (predetermined depth) of pressing or greater made with respect to the first input unit 70A, and the second operation input may be a predetermined degree (predetermined depth) of pressing or greater made with respect to the second input unit 70B. In this case, in the event that the first input unit 70A is deeply pressed by the predetermined degree or greater, the operation detection unit 58 determines that such an operation is the first operation input. Further, in the event that the second input unit 70B is deeply pressed by the predetermined degree or greater, the operation detection unit 58 determines that such an operation is the second operation input. Further, for example, the first operation input may be a predetermined degree (predetermined pressure) of strong pressing or greater made with respect to the first input unit 70A, and the second operation input may be a predetermined degree (predetermined pressure) of strong pressing or greater made with respect to the second input unit 70B. In this case, in the event that the first input unit 70A is strongly pressed by the predetermined degree or greater, the operation detection unit 58 determines that such an operation is the first operation input. Further, in the event that the second input unit 70B is strongly pressed by the predetermined degree or greater, the operation detection unit 58 determines that such an operation is the second operation input.

Figure 4:
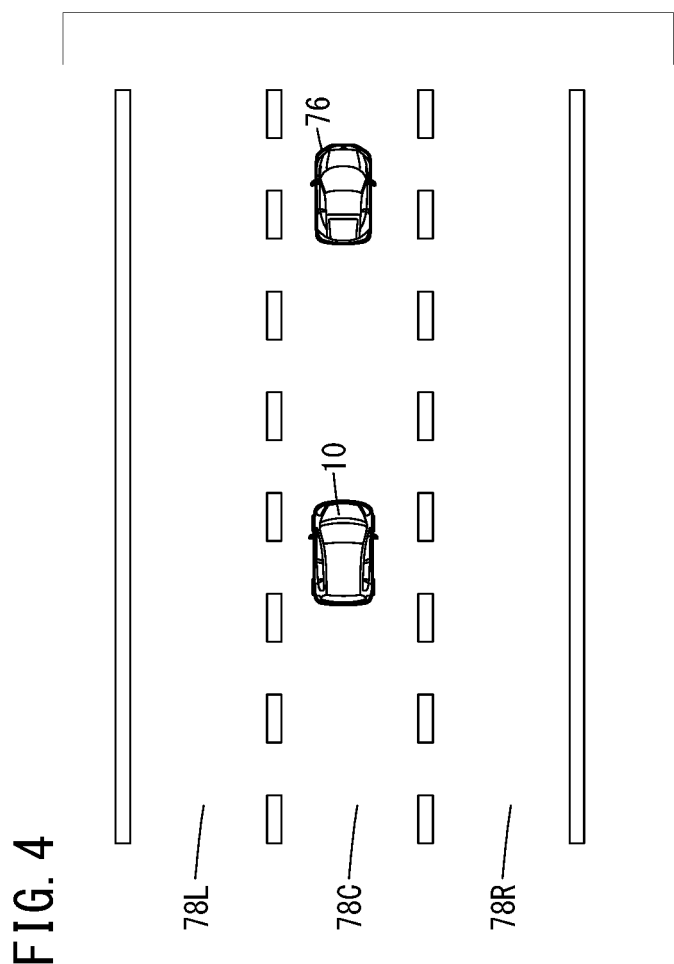
FIG. 4 is a view showing an example of a travel lane.

FIG. 4 is a view showing an example of a travel lane. FIG. 4 shows an example of a case in which the host vehicle 10 and the preceding vehicle 76 are traveling in a host vehicle lane 78C. A first lane (lane, adjacent lane) 78L is located on one side (a left side) of the host vehicle lane (lane) 78C, which is a lane in which the host vehicle 10 is traveling. A second lane (lane, adjacent lane) 78R is located on another side (a right side) of the host vehicle lane (lane) 78C, which is the lane in which the host vehicle 10 is traveling. Moreover, in FIG. 4, an example is illustrated in which only one other vehicle (preceding vehicle) 76 exists in front of the host vehicle 10, however, the present invention is not limited to this feature. There may also be cases in which a plurality of other vehicles 76 are present. Further, there may also be cases in which another vehicle 76 exists in the first lane 78L, and another vehicle 76 exists in the second lane 78R.

The lane change control unit (control unit) 62 carries out a lane change control on the basis of an operation input detected by the operation detection unit 58. More specifically, the lane change control unit 62 carries out the lane change based on an operation input to the operation input unit 68 for the predetermined time period or longer. In the case that the first operation input, and specifically, a long-pressing operation of the first input unit 70A is performed, the lane change control unit 62 carries out a lane change into the lane 78L located on the left side of the host vehicle lane 78C. In the case that the second operation input, and specifically, a long-pressing operation of the second input unit 70B is performed, the lane change control unit 62 carries out a lane change into the lane 78R located on the right side of the host vehicle lane 78C.

The direction from the second input unit 70B toward the first input unit 70A is along a direction in which the direction-indicating operation lever 75 is turned by the user when a lane change into the lane 78L located on the left side of the host vehicle lane 78C is performed by steering by the user. Further, the direction from the first input unit 70A toward the second input unit 70B is along a direction in which the direction-indicating operation lever 75 is turned by the user when a lane change into the lane 78R located on the right side of the host vehicle lane 78C is performed by steering by the user. In the present embodiment, such a configuration is employed for the following reasons. More specifically, in the case that the user carries out a lane change into the lane 78L located on the left side of the host vehicle lane 78C by steering, the distal end of the direction-indicating operation lever 75 is moved upward by the user, in a manner so as to cause the direction-indicating operation lever 75 to turn counterclockwise. Accordingly, when the lane change is instructed into the lane 78L located on the left side of the host vehicle lane 78C, pressing of the first input unit 70A, which is located on an upper side of the second input unit 70B, is easy for the user to imagine intuitively. On the other hand, in the case that the user carries out a lane change into the lane 78R located on the right side of the host vehicle lane 78C by steering, the distal end of the direction-indicating operation lever 75 is moved downward by the user, in a manner so as to cause the direction-indicating operation lever 75 to turn clockwise. Accordingly, when the lane change is instructed into the lane 78R located on the right side of the host vehicle lane 78C, pressing of the second input unit 70B, which is located on a lower side of the first input unit 70A, is easy for the user to imagine intuitively. In accordance with such reasoning, the present embodiment is configured in the manner described above.

The operation detection unit 58 is also capable of detecting an operation input for less than the predetermined time period. An operation input for less than the predetermined time period may be performed, for example, when the user sets the travel speed of the host vehicle 10. The speed setting unit 60 carries out setting of the travel speed of the host vehicle 10 on the basis of an operation input for less than the predetermined time period, which is detected by the operation detection unit 58. Each time that the first input unit 70A, i.e., the resume switch, is pressed, the speed setting unit 60 increases the set travel speed, for example, by roughly 1.5 km/h. Each time that the second input unit 70B, i.e., the set switch, is pressed, the speed setting unit 60 decreases the set travel speed, for example, by 1.5 km/h.

In the case that the angle of rotation of the steering wheel 74 is less than a predetermined angle with respect to the neutral position, the lane change control unit 62 may carry out the lane change on the basis of the operation input to the operation input unit 68. On the other hand, in the case that the angle of rotation of the steering wheel 74 is greater than or equal to the predetermined angle with respect to the neutral position, the lane change control unit 62 may be operated so as not to carry out the lane change on the basis of the operation input to the operation input unit 68. For example, there is a concern that erroneous pressing of the first input unit 70A and the second input unit 70B may occur when the angle of rotation of the steering wheel 74 becomes greater than the neutral position.

The lane change proposal unit 64 is capable of issuing the lane change proposal, and in particular, of issuing the lane change proposal to the user. The lane change proposal unit 64 issues the lane change proposal to the user using, for example, the HMI 22. More specifically, the lane change proposal unit 64 issues the lane change proposal to the user by way of voice. Such a voice message can be output using the speaker 46.

Moreover, in this instance, although an exemplary case has been described in which the lane change proposal is issued by way of voice, the present invention is not limited to this feature. For example, a lane change proposal may be issued by way of a display. Further, the lane change proposal may be issued by way of a combination of voice and display. Such a lane change proposal by way of a display can be issued using, for example, the display 40 or the like.

In the case that a lane change proposal is issued by the lane change proposal unit 64, using, for example, the operation input unit 68, the user may perform an indication of intention, which indicates whether or not the user agrees with the lane change proposal. For example, in the case that a lane change into the lane 78L located on the left side of the host vehicle lane 78C is proposed by the lane change proposal unit 64, if the user agrees with the lane change proposal, the user performs, for example, the first operation input. The first operation input, as noted previously, is a long-pressing operation made with respect to the first input unit 70A for the predetermined time period or longer. However, the present invention is not necessarily limited to this feature. Not performing the first operation input implies that the user disagrees with the lane change proposal. For example, in the case that a lane change into the lane 78R located on the right side of the host vehicle lane 78C is proposed by the lane change proposal unit 64, if the user agrees with the lane change proposal, the user performs, for example, the second operation input. The second operation input, as noted previously, is a long-pressing operation made with respect to the second input unit 70B for the predetermined time period or longer. However, the present invention is not necessarily limited to this feature. Not performing the second operation input implies that the user disagrees with the lane change proposal. Moreover, in this instance, an exemplary case has been described in which the first operation input made in response to the lane change proposal into the lane 78L implies agreement with the lane change proposal. Further, in this instance, an exemplary case has been described in which non-performance of the first operation input in response to the lane change proposal into the lane 78L implies disagreement with the lane change proposal. Further, an exemplary case has been described in which the second operation input made in response to the lane change proposal into the lane 78R implies agreement with the lane change proposal. Further, in this instance, an exemplary case has been described in which non-performance of the second operation input in response to the lane change proposal into the lane 78R implies disagreement with the lane change proposal. However, the present invention is not limited to these features. For example, with respect to the lane change proposal into the lane 78L, as well as with respect to the lane change proposal into the lane 78R, the second operation input may be used to imply agreement with such lane change proposals. Further, with respect to the lane change proposal into the lane 78L, as well as with respect to the lane change proposal into the lane 78R, the first operation input may be used to imply disagreement with such lane change proposals.

The storage unit 56 includes a non-illustrated volatile memory, and a non-illustrated nonvolatile memory. As an example of the volatile memory, there may be cited a RAM (Random Access Memory). As an example of the nonvolatile memory, there may be cited a ROM (Read Only Memory), a flash memory, or the like. The external environmental information, the vehicle body behavior information, and the vehicle operation information, etc., are stored, for example, in the volatile memory. Programs, tables, maps, and the like are stored, for example, in the nonvolatile memory.

Figure 5:
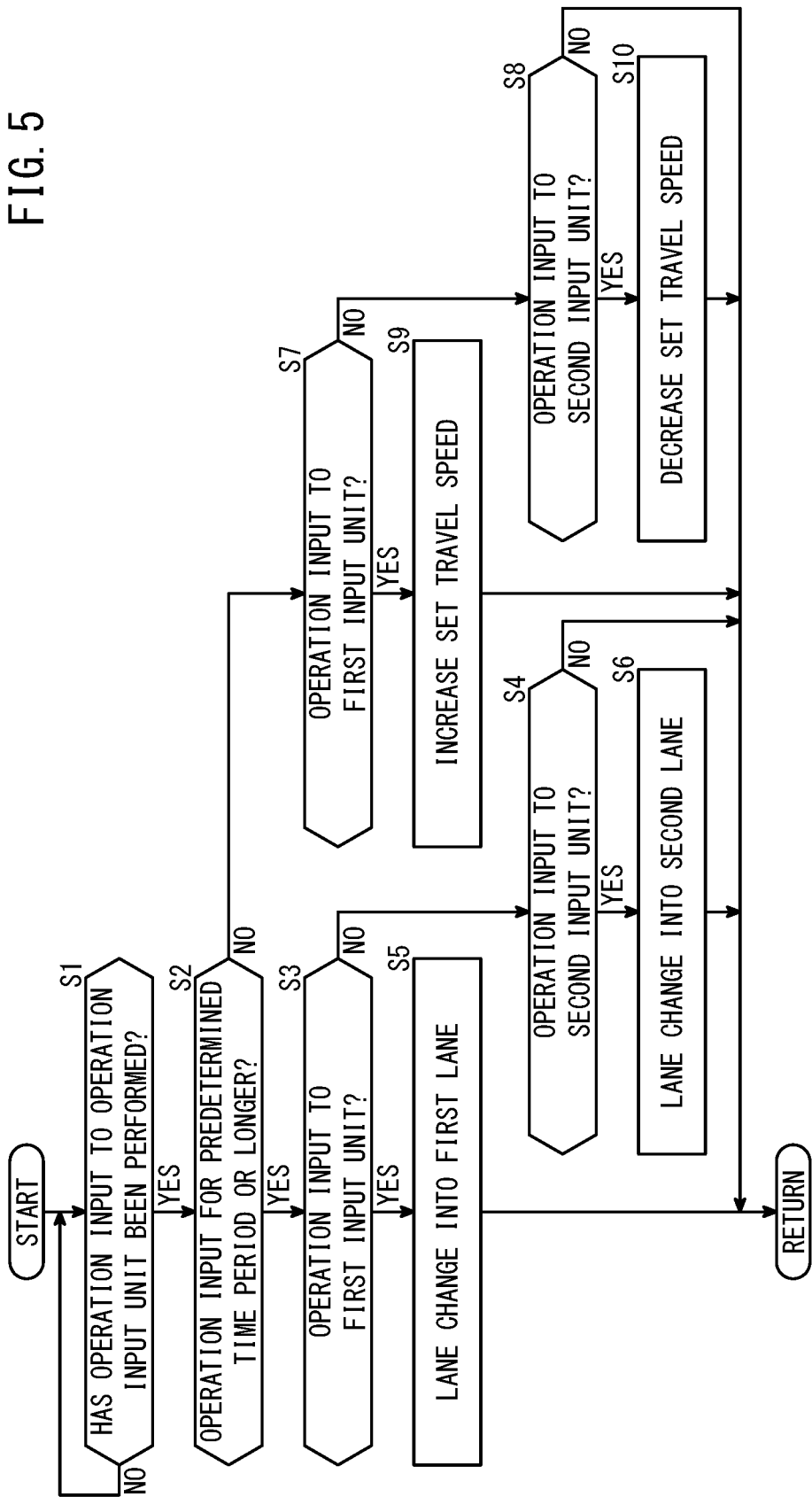
FIG. 5 is a flowchart showing an example of operations of the vehicle control device according to the first embodiment.

FIG. 5 is a flowchart showing an example of operations of the vehicle control device according to the present embodiment.

In step S1, on the basis of a signal supplied from the operation input unit 68, the operation detection unit 58 detects whether or not an operation input to the operation input unit 68 has been performed by the user. If such an operation input is made with respect to the operation input unit 68 (YES in step S1), the process transitions to step S2. If such an operation input is not made with respect to the operation input unit 68 (NO in step S1), then step S1 is repeated.

In step S2, the operation detection unit 58 determines whether or not the operation input to the operation input unit 68 is an operation input for the predetermined time period or longer. If such an operation input is an operation input for the predetermined time period or longer (YES in step S2), the process transitions to step S3. If such an operation input is an operation input for less than the predetermined time period (NO in step S2), the process transitions to step S7.

In step S3, the operation detection unit 58 determines whether or not the operation input to the operation input unit 68 is an operation input to the first input unit 70A. If such an operation input is an operation input to the first input unit 70A (YES in step S3), or in other words, if it is the first operation input, the process transitions to step S5. If such an operation input is not an operation input to the first input unit 70A (NO in step S3), the process transitions to step S4.

In step S4, the operation detection unit 58 determines whether or not the operation input to the operation input unit 68 is an operation input to the second input unit 70B. If such an operation input is an operation input to the second input unit 70B (YES in step S4), or in other words, if it is the second operation input, the process transitions to step S6. If such an operation input is not an operation input to the second input unit 70B (NO in step S4), the process shown in FIG. 5 is brought to an end.

In step S5, the lane change control unit 62 carries out a lane change into the lane 78L located on the left side of the host vehicle lane 78C. Upon completion of step S5, the process shown in FIG. 5 is brought to an end.

In step S6, the lane change control unit 62 carries out a lane change into the lane 78R located on the right side of the host vehicle lane 78C. Upon completion of step S6, the process shown in FIG. 5 is brought to an end.

In step S7, the operation detection unit 58 determines whether or not the operation input to the operation input unit 68 is an operation input to the first input unit 70A. If such an operation input is an operation input to the first input unit 70A (YES in step S7), or in other words, if it is the first operation input, the process transitions to step S9. If such an operation input is not an operation input to the first input unit 70A (NO in step S7), the process transitions to step S8.

In step S8, the operation detection unit 58 determines whether or not the operation input to the operation input unit 68 is an operation input to the second input unit 70B. If such an operation input is an operation input to the second input unit 70B (YES in step S8), or in other words, if it is the second operation input, the process transitions to step S10. If such an operation input is not an operation input to the second input unit 70B (NO in step S8), the process shown in FIG. 5 is brought to an end.

In step S9, the speed setting unit 60 increases the set travel speed, for example, by roughly 1.5 km/h. Upon completion of step S9, the process shown in FIG. 5 is brought to an end.

In step S10, the speed setting unit 60 decreases the set travel speed, for example, by 1.5 km/h. Upon completion of step S10, the process shown in FIG. 5 is brought to an end.

In this manner, according to the present embodiment, the instruction for the lane change can be issued using the operation input unit 68, which is capable of being used when increasing or decreasing the travel speed of the host vehicle 10, when initiating the following control with respect to the preceding vehicle 76, or when reinitiating the following control with respect to the preceding vehicle 76. Therefore, according to the present embodiment, it is possible for the vehicle control device 12 having suitable operability to be provided.

Modification 1

A vehicle control device, a vehicle, and a vehicle control method according to a first modification of the present embodiment will be described with reference to FIG. 6.

In the present modification, in the case that the operation input to the operation input unit 68 is performed after setting of the travel speed of the host vehicle 10 by the speed setting unit 60 has been completed, the lane change control is carried out by the lane change control unit 62 on the basis of the operation input.

Figure 6:
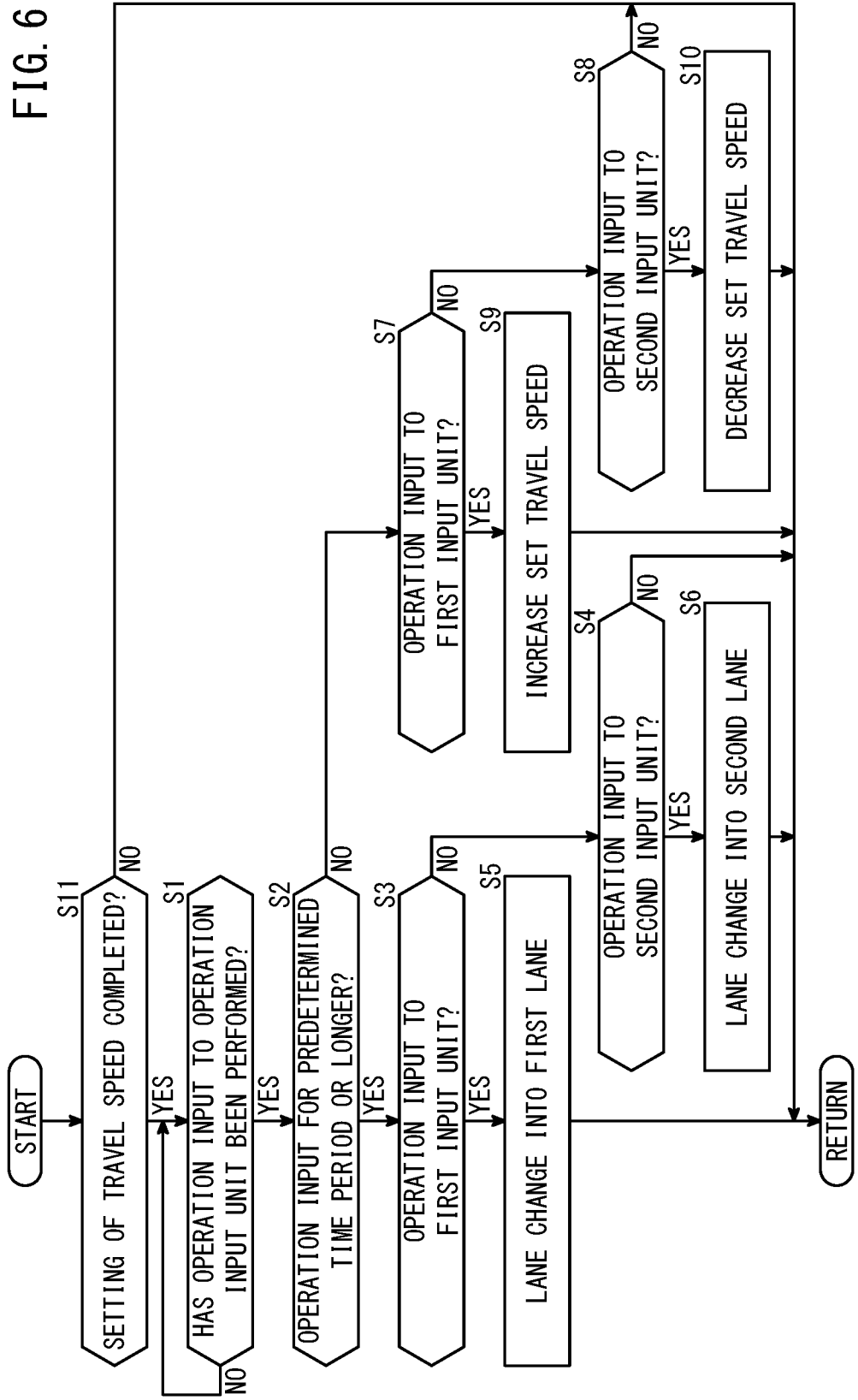
FIG. 6 is a flowchart illustrating an example of operations of the vehicle control device according to a first modification of the first embodiment.

FIG. 6 is a flowchart illustrating an example of operations of the vehicle control device according to the present modification.

First, in step S11, the computation unit 54 determines whether setting of the travel speed of the host vehicle 10 by the speed setting unit 60 has been completed. In the case that setting of the travel speed of the host vehicle 10 by the speed setting unit 60 has been completed (YES in step S11), the process transitions to step S1. In the case that setting of the travel speed of the host vehicle 10 by the speed setting unit 60 has not been completed (NO in step S11), the process illustrated in FIG. 6 is brought to an end.

Steps S1 to S10 are the same as steps S1 to S10 described above with reference to FIG. 5, and therefore, description of these steps is omitted.

In the foregoing manner, in the case that the operation input to the operation input unit 68 is performed after setting of the travel speed of the host vehicle 10 by the speed setting unit 60 has been completed, the lane change control is carried out on the basis of the operation input.

Modification 2

A vehicle control device, a vehicle, and a vehicle control method according to a second modification of the present embodiment will be described with reference to FIG. 7.

According to the present modification, in the case that the operation input is performed after setting of the travel speed by the speed setting unit 60 has been completed, and traveling of the host vehicle 10 at the set travel speed has been performed for greater than or equal to a distance threshold value or greater than or equal to a time threshold value, the lane change is carried out on the basis of the operation input. It should be noted that the distance threshold value and the time threshold value can be set in advance. Further, the distance threshold value and the time threshold value can be appropriately changed based on the travel speed of the host vehicle 10, the travel environment of the host vehicle 10 (the road environment, the weather, positional relationships between the host vehicle 10 and other vehicles 76, the number of other vehicles 76) and the like.

Figure 7:
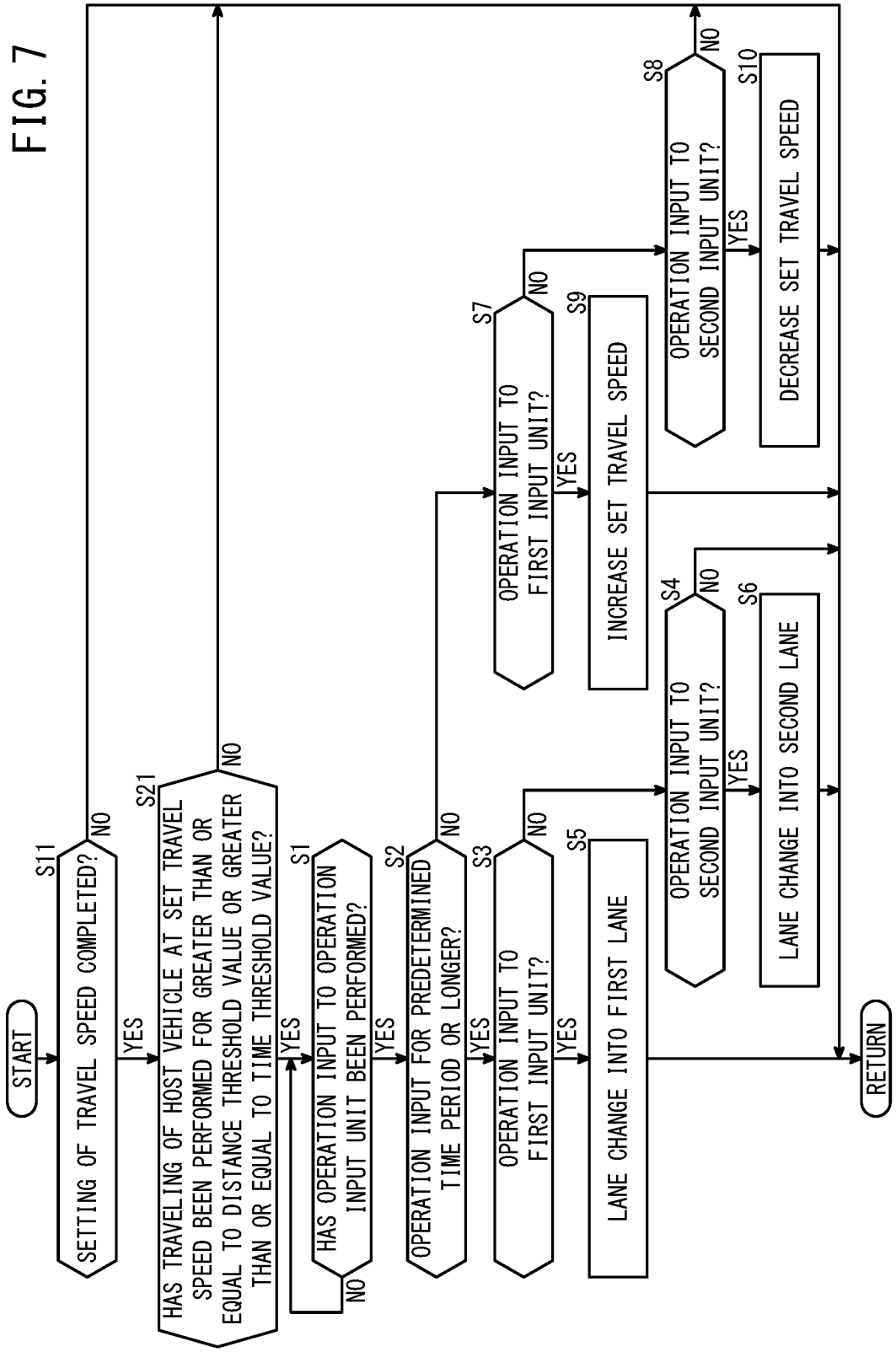
FIG. 7 is a flowchart illustrating an example of operations of the vehicle control device according to a second modification of the first embodiment.

FIG. 7 is a flowchart illustrating an example of operations of the vehicle control device according to the present modification.

First, in step S11, the computation unit 54 determines whether setting of the travel speed of the host vehicle 10 by the speed setting unit 60 has been completed. In the case that setting of the travel speed of the host vehicle 10 by the speed setting unit 60 has been completed (YES in step S11), the process transitions to step S21. In the case that setting of the travel speed of the host vehicle 10 by the speed setting unit 60 has not been completed (NO in step S11), the process illustrated in FIG. 7 is brought to an end.

In step S21, the computation unit 54 determines whether traveling of the host vehicle 10 at the set travel speed has been performed for greater than or equal to the distance threshold value or greater than or equal to the time threshold value. In the case that traveling of the host vehicle 10 at the set travel speed has already been performed for greater than or equal to the distance threshold value or greater than or equal to the time threshold value (YES in step S21), the process transitions to step S1. In the case that traveling of the host vehicle 10 at the set travel speed has still not been performed for greater than or equal to the distance threshold value or greater than or equal to the time threshold value (NO in step S21), the process shown in FIG. 7 is brought to an end.

Steps S1 to S10 are the same as steps S1 to S10 described above with reference to FIG. 5, and therefore, description of these steps is omitted.

In the foregoing manner, in the case that the operation input is performed after setting of the travel speed by the speed setting unit 60 has been completed, and traveling of the host vehicle 10 at the set travel speed has been performed for greater than or equal to the distance threshold value or greater than or equal to the time threshold value, the control as described below may be carried out. More specifically, in such a case, the lane change control may be performed on the basis of the operation input.

Modification 3

A vehicle control device, a vehicle, and a vehicle control method according to a third modification of the present embodiment will be described with reference to FIG. 8.

According to the present modification, the vehicle control device 12 includes an automatic setting mode in which the travel speed of the host vehicle 10 is automatically set, and a manual setting mode in which the travel speed of the host vehicle 10 is manually set. According to the present modification, in the case that the operation input is performed using the operation input unit 68 in the automatic setting mode, the lane change control is carried out by the lane change control unit 62 on the basis of the operation input. On the other hand, according to the present modification, in the case that the operation input is performed using the operation input unit 68 in the manual setting mode, setting of the travel speed of the host vehicle 10 is carried out by the speed setting unit 60 on the basis of the operation input.

Figure 8:
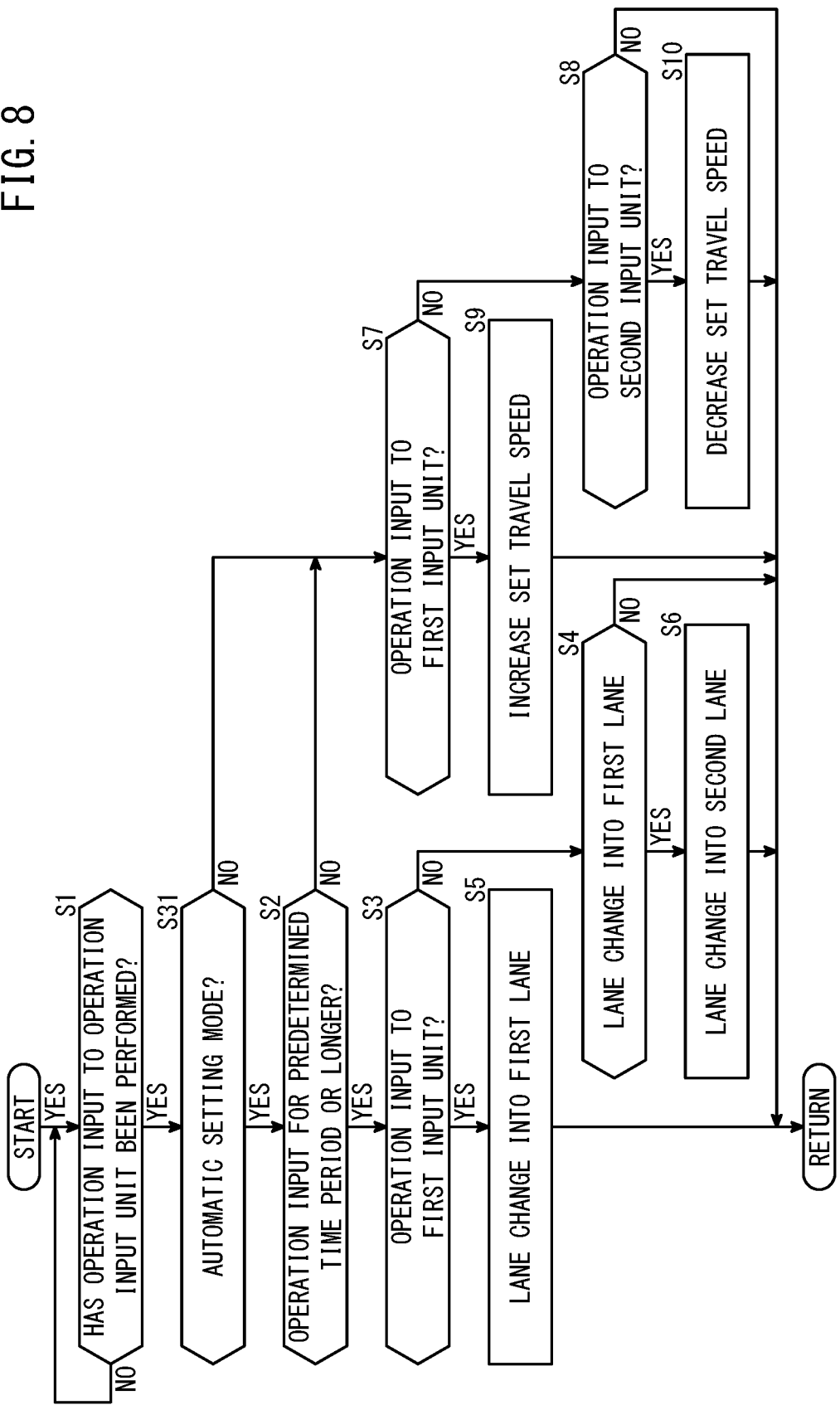
FIG. 8 is a flowchart illustrating an example of operations of the vehicle control device according to a third modification of the first embodiment.

FIG. 8 is a flowchart illustrating an example of operations of the vehicle control device according to the present modification.

In step S1, on the basis of a signal supplied from the operation input unit 68, the operation detection unit 58 detects whether or not an operation input to the operation input unit 68 has been performed by the user. If such an operation input is made with respect to the operation input unit 68 (YES in step S1), the process transitions to step S31. If such an operation input is not made with respect to the operation input unit 68 (NO in step S1), then step S1 is repeated.

In step S31, the computation unit 54 determines whether the current operation mode is the automatic setting mode or the manual setting mode. The automatic setting mode, as noted previously, is an operation mode in which the travel speed of the host vehicle 10 is automatically set. The manual setting mode is an operation mode in which the travel speed of the host vehicle 10 is manually set. If the current operation mode is the automatic setting mode (YES in step S31), the process transitions to step S2. If the current operation mode is the manual setting mode (NO in step S31), the process transitions to step S7.

Steps S2 to S10 are the same as steps S2 to S10 described above with reference to FIG. 5, and therefore, description of these steps is omitted.

In the foregoing manner, in the case that the operation input is made with respect to the operation input unit 68 in the automatic setting mode, the lane change control may be carried out by the lane change control unit 62 on the basis of the operation input. On the other hand, in the case that the operation input is made with respect to the operation input unit 68 in the manual setting mode, setting of the travel speed of the host vehicle 10 may be carried out by the speed setting unit 60 on the basis of the operation input.

Modification 4

A vehicle control device, a vehicle, and a vehicle control method according to a fourth modification of the present embodiment will be described with reference to FIG. 9.

The vehicle control device 12 according to the present modification includes a first driving control state in which the user is required to be grasping the steering wheel 74, and a second driving control state in which the user is not required to be grasping the steering wheel 74. According to the present modification, in the first driving control state, the lane change control unit 62 carries out the lane change control on the basis of an operation input to the operation input unit 68. Further, according to the present modification, in the second driving control state, the lane change control unit 62 does not perform the lane change on the basis of the operation input to the operation input unit 68.

Figure 9:
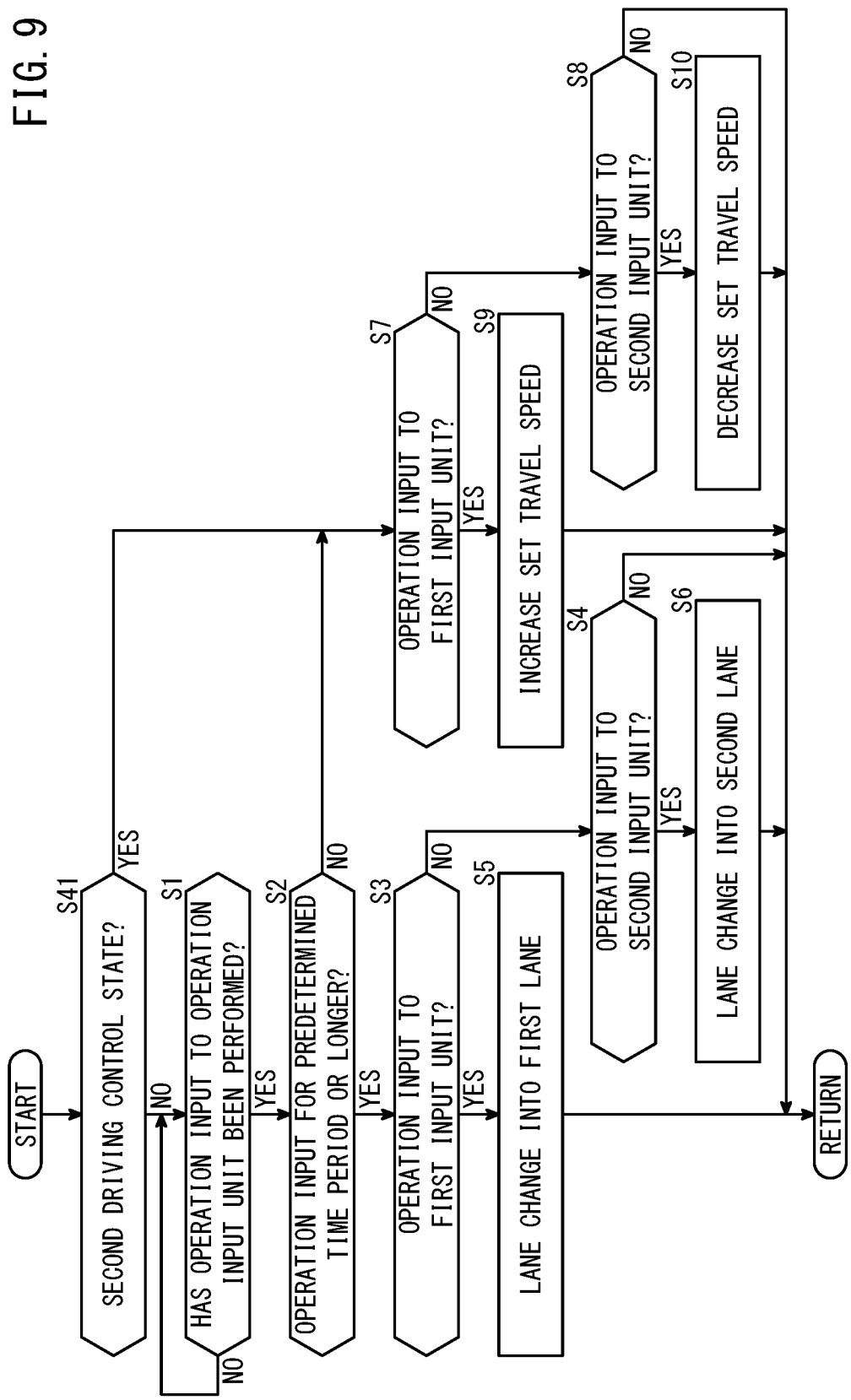
FIG. 9 is a flowchart illustrating an example of operations of the vehicle control device according to a fourth modification of the first embodiment.

FIG. 9 is a flowchart illustrating an example of operations of the vehicle control device according to the present modification.

In step S41, the computation unit 54 determines whether the current driving control state is the first driving control state or the second driving control state. As described above, the first driving control state is a driving control state in which the user is required to be grasping the steering wheel 74. As described above, the second driving control state is a driving control state in which the user is not required to be grasping the steering wheel 74. If the current driving control state is the second driving control state (YES in step S41), the process transitions to step S7. If the current driving control state is the first driving control state (NO in step S41), the process transitions to step S1.

Steps S1 to S10 are the same as steps S1 to S10 described above with reference to FIG. 5, and therefore, description of these steps is omitted.

In the forgoing manner, in the first driving control state, the lane change control may be carried out on the basis of the operation input to the operation input unit 68, and in the second driving control state, the lane change may not be carried out on the basis of the operation input to the operation input unit 68.

Modification 5

A vehicle control device, a vehicle, and a vehicle control method according to a fifth modification of the present embodiment will be described with reference to FIG. 10.

According to the present modification, even in the second driving control state, which is a driving control state in which the user is not required to be grasping the steering wheel 74, the following process is performed in the case that the user is grasping the steering wheel 74. Specifically, in such a case, the lane change control is carried out on the basis of the operation input to the operation input unit 68. This is because, even in the second driving control state, which is a driving control state in which the user is not required to be grasping the steering wheel 74, there may be situations in which a user who feels a sense of insecurity may grasp the steering wheel 74.

Figure 10:
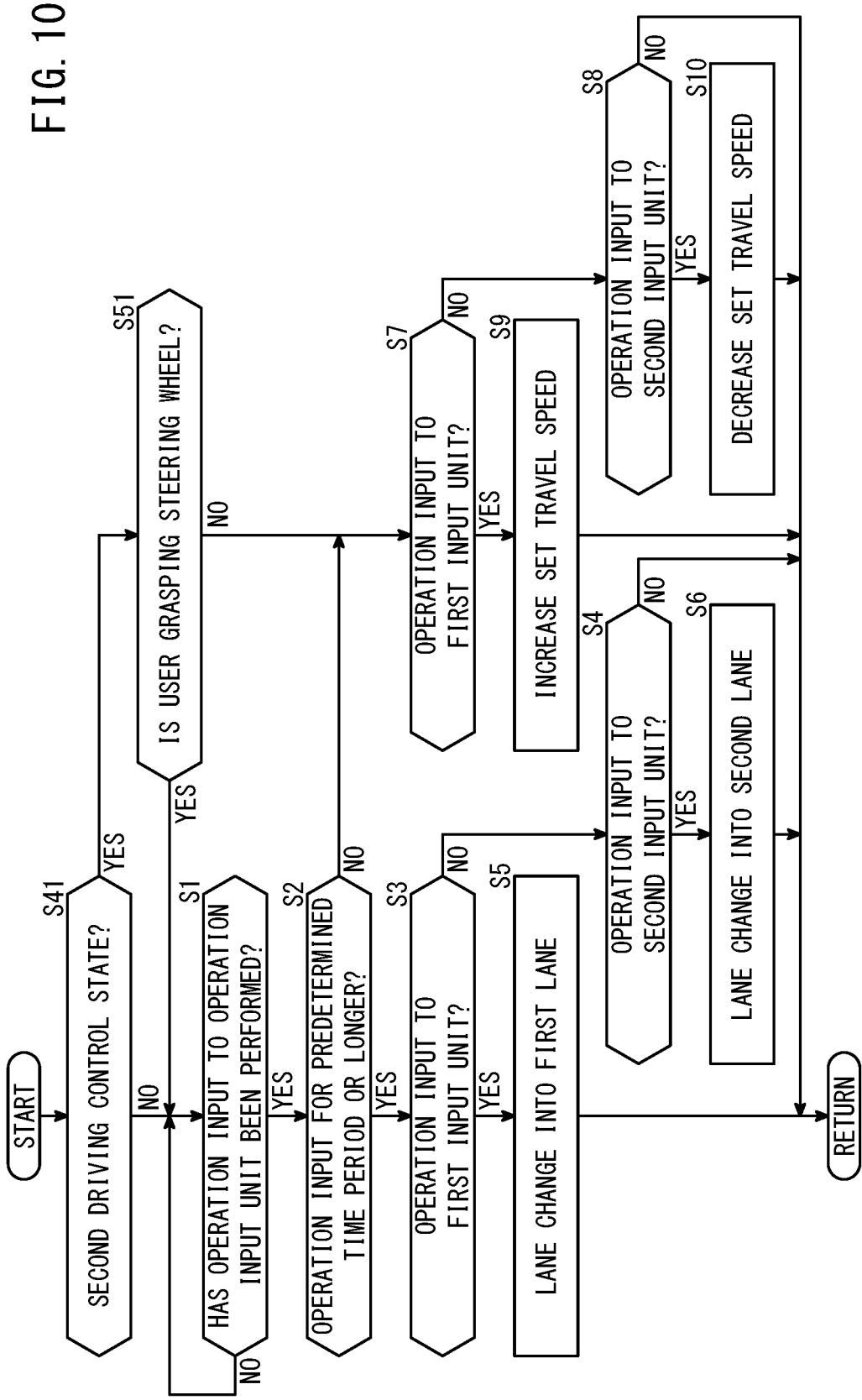
FIG. 10 is a flowchart illustrating an example of operations of the vehicle control device according to a fifth modification of the first embodiment.

FIG. 10 is a flowchart illustrating an example of operations of the vehicle control device according to the present modification.

In step S41, the computation unit 54 determines whether the current driving control state is the first driving control state or the second driving control state. As described above, the first driving control state is a driving control state in which the user is required to be grasping the steering wheel 74. As described above, the second driving control state is a driving control state in which the user is not required to be grasping the steering wheel 74. If the current driving control state is the second driving control state (YES in step S41), the process transitions to step S51. If the current driving control state is the first driving control state (NO in step S41), the process transitions to step S1.

In step S51, the computation unit 54 determines whether or not the user is grasping the steering wheel 74. The computation unit 54 is capable of determining whether the user is grasping the steering wheel 74, for example, on the basis of a signal supplied from the contact sensor 42. In the case that the user is grasping the steering wheel 74 (YES in step S51), the process transitions to step S1. In the case that the user is not grasping the steering wheel 74 (NO in step S51), the process transitions to step S7.

Steps S1 to S10 are the same as steps S1 to S10 described above with reference to FIG. 5, and therefore, description of these steps is omitted.

In this manner, in the case of being in the second driving control state, which is a driving control state in which the user is not required to be grasping the steering wheel 74, and the user is not grasping the steering wheel 74, the following process is performed. Specifically, in such a case, the lane change control unit 62 does not carry out the lane change control on the basis of an operation input to the operation input unit 68. Since it is not easy in all cases for the user to operate the operation input unit 68 accurately in a state in which the user is not grasping the steering wheel 74, in accordance with such a configuration, it is possible to realize an improvement in safety. On the other hand, in the case that the vehicle is in the second driving control state and the user is grasping the steering wheel 74, the lane change control unit 62 carries out the lane change control on the basis of the operation input to the operation input unit 68. In the state in which the user is grasping the steering wheel 74, the user is able to accurately operate the operation input unit 68, and therefore, in accordance with such a configuration, it is possible to realize favorable operability while safety is ensured.

Modification 6

A vehicle control device, a vehicle, and a vehicle control method according to a sixth modification of the present embodiment will be described with reference to FIG. 11.

In the case that the angle of rotation of the steering wheel 74 is less than a predetermined angle with respect to the neutral position, the lane change is carried out on the basis of the operation input to the operation input unit 68. On the other hand, in the case that the angle of rotation of the steering wheel 74 is greater than or equal to the predetermined angle with respect to the neutral position, the lane change is not carried out on the basis of the operation input to the operation input unit 68.

Figure 11:
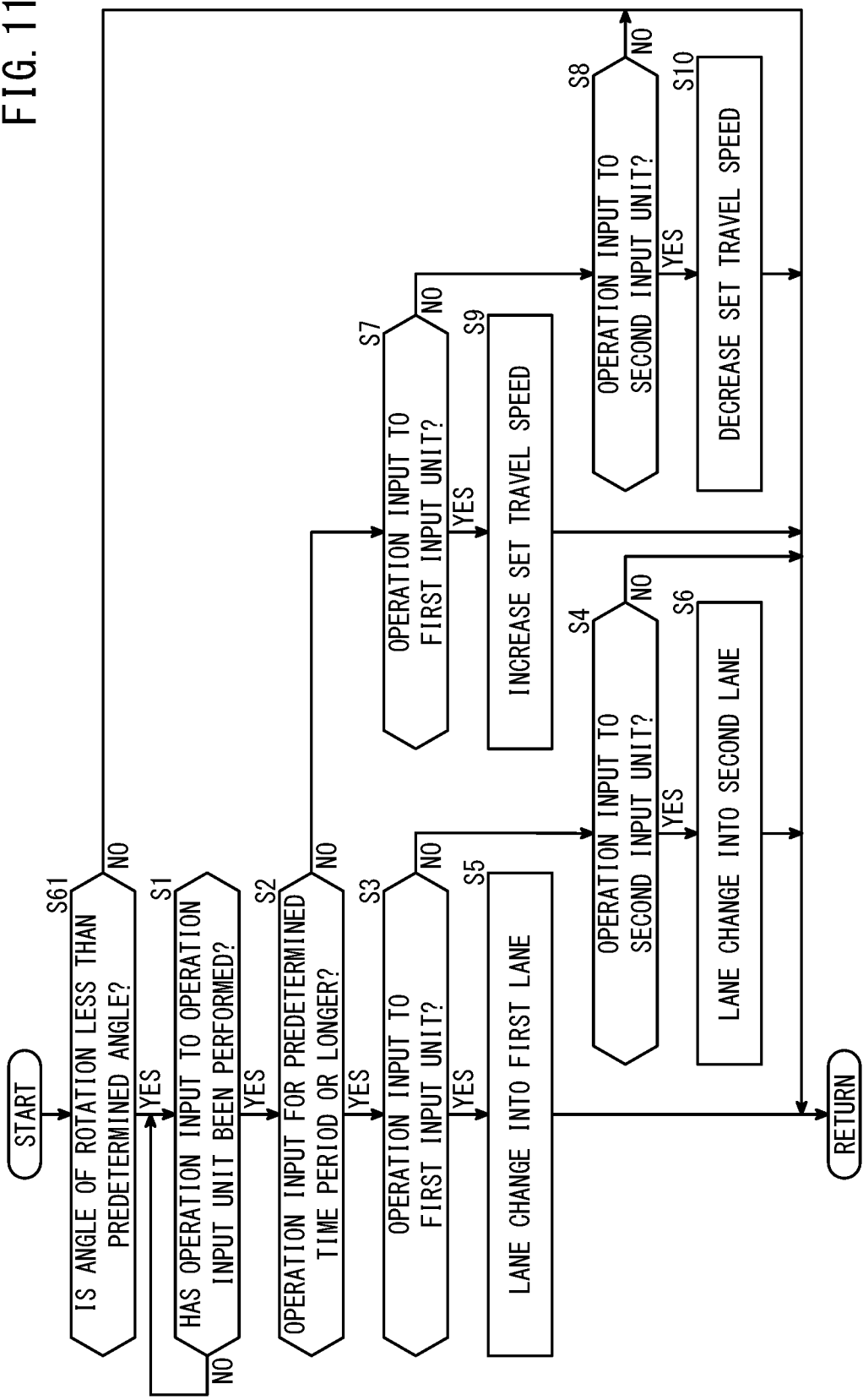
FIG. 11 is a flowchart illustrating an example of operations of the vehicle control device according to a sixth modification of the first embodiment.

FIG. 11 is a flowchart illustrating an example of operations of the vehicle control device according to the present modification.

In step S61, the computation unit 54 determines whether or not the angle of rotation of the steering wheel 74 is less than a predetermined angle with respect to the neutral position. In the case that the angle of rotation of the steering wheel 74 is greater than or equal to the predetermined angle with respect to the neutral position (NO in step S61), the process shown in FIG. 11 is brought to an end. In the case that the angle of rotation of the steering wheel 74 is less than the predetermined angle with respect to the neutral position (YES in step S61), the process transitions to step S1.

Steps S1 to S10 are the same as steps S1 to S10 described above with reference to FIG. 5, and therefore, description of these steps is omitted.

In the foregoing manner, in the case that the angle of rotation of the steering wheel 74 is less than the predetermined angle with respect to the neutral position, the lane change may be carried out on the basis of the operation input to the operation input unit 68. On the other hand, in the case that the angle of rotation of the steering wheel 74 is greater than or equal to the predetermined angle with respect to the neutral position, the lane change may not be carried out on the basis of the operation input to the operation input unit 68.

Modification 7

A vehicle control device, a vehicle, and a vehicle control method according to a seventh modification of the present embodiment will be described with reference to FIG. 12.

In the present modification, in the case that the operation input to the operation input unit 68 is an operation input performed by the user in response to the lane change proposal issued by the lane change proposal unit 64, the lane change control is carried out on the basis of the operation input to the operation input unit 68. On the other hand, in the case that the operation input to the operation input unit 68 is not an operation input performed by the user in response to the lane change proposal issued by the lane change proposal unit 64, the set travel speed is changed on the basis of the operation input to the operation input unit 68.

Figure 12:
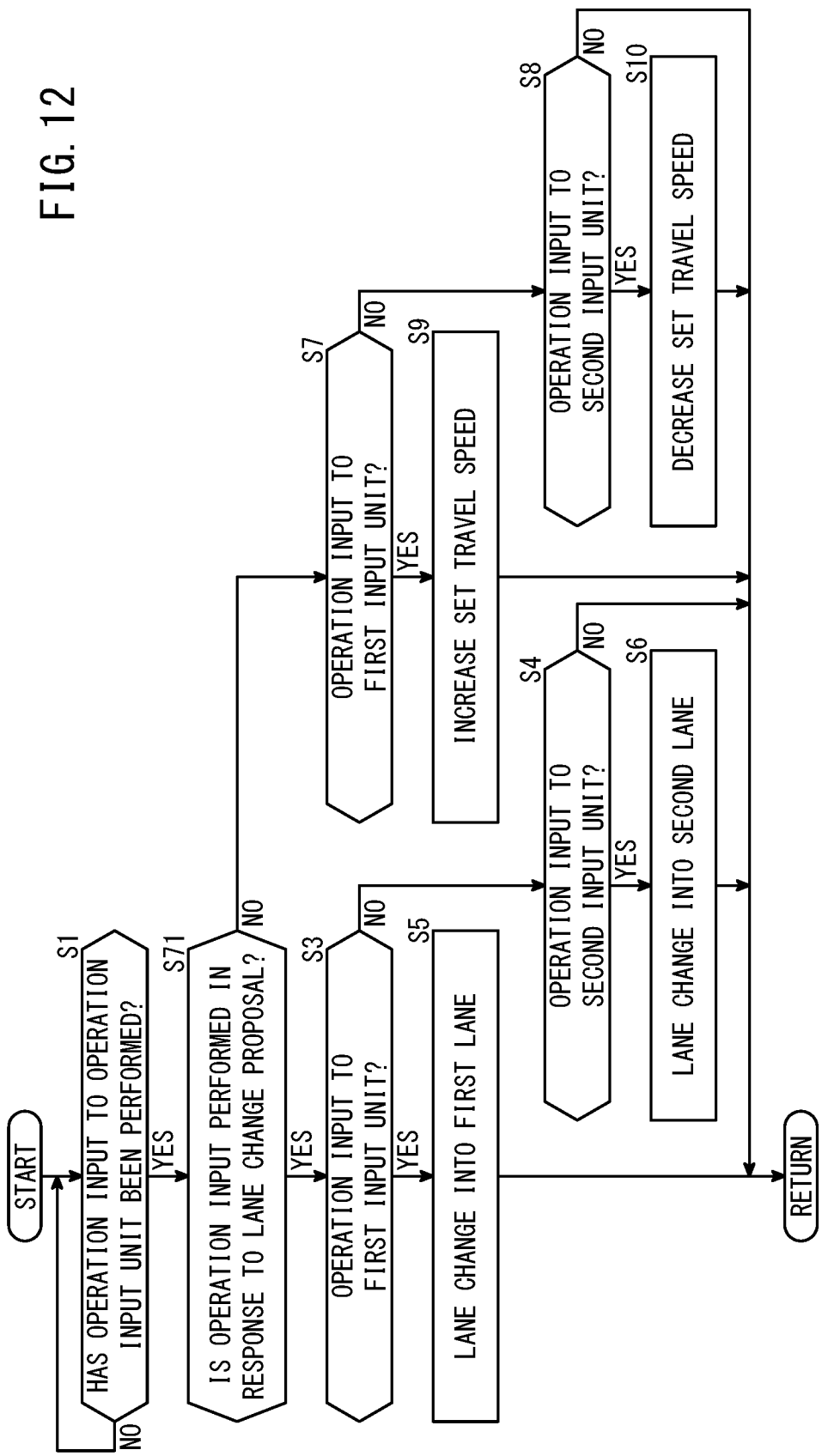
FIG. 12 is a flowchart illustrating an example of operations of the vehicle control device according to a seventh modification of the first embodiment.

FIG. 12 is a flowchart illustrating an example of operations of the vehicle control device according to the present modification.

In step S1, on the basis of a signal supplied from the operation input unit 68, the operation detection unit 58 detects whether or not an operation input to the operation input unit 68 has been performed by the user. If such an operation input is made with respect to the operation input unit 68 (YES in step S1), the process transitions to step S71. If such an operation input is not made with respect to the operation input unit 68 (NO in step S1), then step S1 is repeated.

In step S71, the computation unit 54 determines whether or not the operation input to the operation input unit 68 is an operation input performed by the user in response to the lane change proposal issued by the lane change proposal unit 64. In the case that the operation input is an operation input performed by the user in response to the lane change proposal issued by the lane change proposal unit 64 (YES in step S71), the process transitions to step S3. In the case that the operation input is not an operation input performed by the user in response to the lane change proposal issued by the lane change proposal unit 64 (NO in step S71), the process transitions to step S7.

Steps S3 to S10 are the same as steps S3 to S10 described above with reference to FIG. 5, and therefore, description of these steps is omitted.

In the foregoing manner, in the case that the operation input to the operation input unit 68 is an operation input performed by the user in response to the lane change proposal issued by the lane change proposal unit 64, the lane change control may be carried out on the basis of the operation input to the operation input unit 68. On the other hand, in the case that the operation input to the operation input unit 68 is not an operation input performed by the user in response to the lane change proposal issued by the lane change proposal unit 64, the set travel speed may be changed on the basis of the operation input to the operation input unit 68.

Modification 8

A vehicle control device, a vehicle, and a vehicle control method according to an eighth modification of the present embodiment will be described with reference to FIG. 13.

According to the present modification, in the case that the operation input, and specifically, the first operation input to the first input unit 70A is performed in response to the lane change proposal into the lane 78L located on the left side of the host vehicle lane 78C, the lane change is carried out. Further, in the case that the operation input, and specifically, the second operation input to the second input unit 70B is performed in response to the lane change proposal into the lane 78L located on the left side of the host vehicle lane 78C, the lane change is not carried out. Further, in the case that the operation input, and specifically, the first operation input to the first input unit 70A is performed in response to the lane change proposal into the lane 78R located on the right side of the host vehicle lane 78C, the lane change is not carried out. Further, in the case that the operation input, and specifically, the second operation input to the second input unit 70B is performed in response to the lane change proposal into the lane 78R located on the right side of the host vehicle lane 78C, the lane change is carried out.

Figure 13:
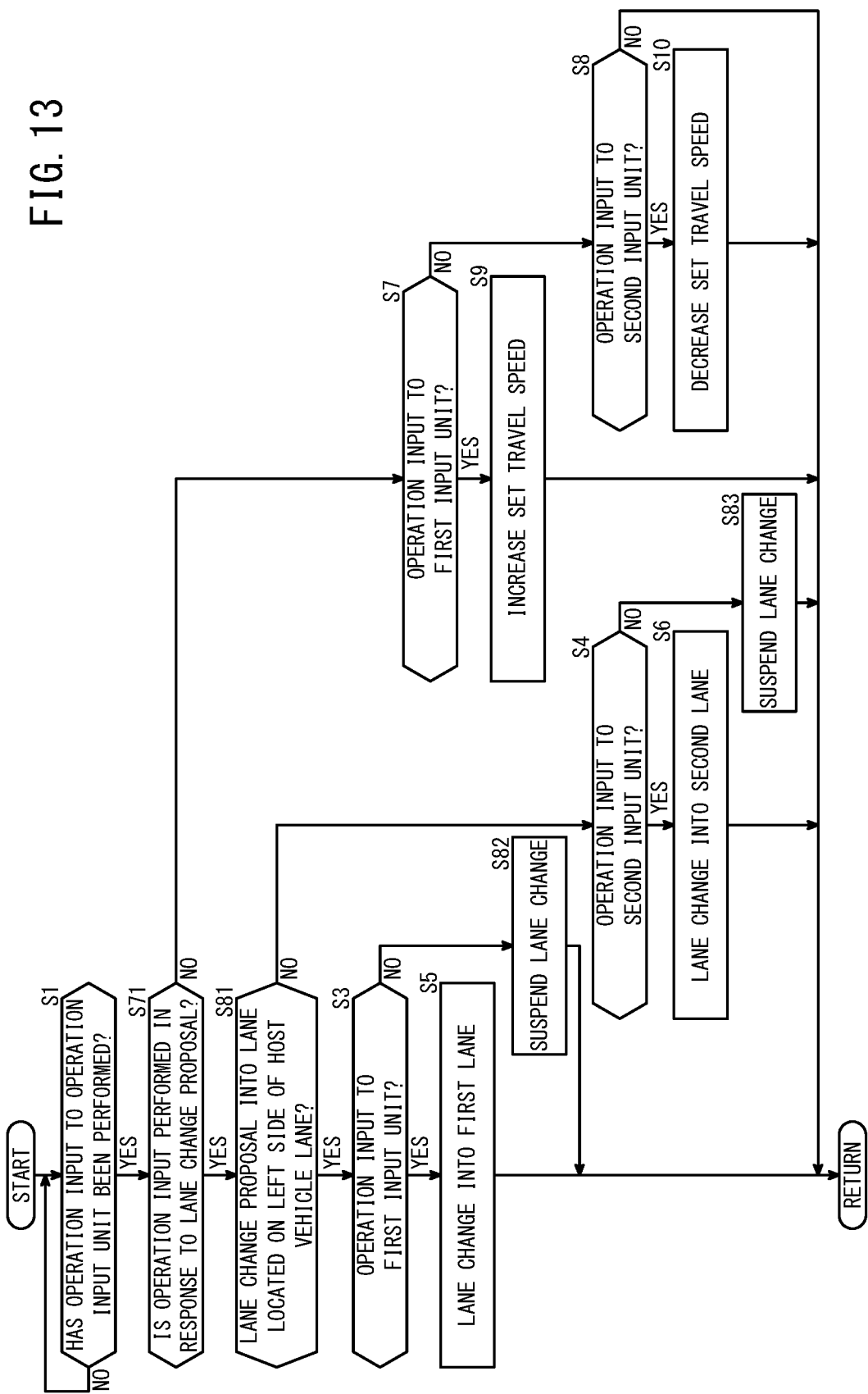
FIG. 13 is a flowchart illustrating an example of operations of the vehicle control device according to an eighth modification of the first embodiment.

FIG. 13 is a flowchart illustrating an example of operations of the vehicle control device according to the present modification.

In step S1, on the basis of a signal supplied from the operation input unit 68, the operation detection unit 58 detects whether or not an operation input to the operation input unit 68 has been performed by the user. If such an operation input is made with respect to the operation input unit 68 (YES in step S1), the process transitions to step S71. If such an operation input is not made with respect to the operation input unit 68 (NO in step S1), then step S1 is repeated.

In step S71, the computation unit 54 determines whether or not the operation input to the operation input unit 68 is an operation input performed by the user in response to the lane change proposal issued by the lane change proposal unit 64. In the case that the operation input is an operation input performed by the user in response to the lane change proposal issued by the lane change proposal unit 64 (YES in step S71), the process transitions to step S81. In the case that the operation input is not an operation input performed by the user in response to the lane change proposal issued by the lane change proposal unit 64 (NO in step S71), the process transitions to step S7.

In step S81, the computation unit 54 determines whether or not the lane change proposal issued by the lane change proposal unit 64 is a lane change proposal into the lane 78L located on the left side of the host vehicle lane 78C. In the case that the lane change proposal issued by the lane change proposal unit 64 is a lane change proposal into the lane 78L located on the left side of the host vehicle lane 78C (YES in step S81), the process transitions to step S3. In the case that the lane change proposal issued by the lane change proposal unit 64 is a lane change proposal into the lane 78R located on the right side of the host vehicle lane 78C (NO in step S81), the process transitions to step S4.

In step S3, the operation detection unit 58 determines whether or not the operation input to the operation input unit 68 is an operation input to the first input unit 70A. If such an operation input is an operation input to the first input unit 70A (YES in step S3), or in other words, if it is the first operation input, the process transitions to step S5. If such an operation input is not an operation input to the first input unit 70A (NO in step S3), the process transitions to step S82.

In step S4, the operation detection unit 58 determines whether or not the operation input to the operation input unit 68 is an operation input to the second input unit 70B. If such an operation input is an operation input to the second input unit 70B (YES in step S4), or in other words, if it is the second operation input, the process transitions to step S6. If such an operation input is not an operation input to the second input unit 70B (NO in step S4), the process transitions to step S83.

Step S5 is the same as step S5 described above with reference to FIG. 5, and therefore, description of this step is omitted.

In step S82, the lane change control unit 62 does not execute the lane change. Upon completion of step S82, the process shown in FIG. 13 is brought to an end.

Step S6 is the same as step S6 described above with reference to FIG. 5, and therefore, description of this step is omitted.

In step S83, the lane change control unit 62 does not execute the lane change. Upon completion of step S83, the process shown in FIG. 13 is brought to an end.

Steps S7 to S10 are the same as steps S7 to S10 described above with reference to FIG. 5, and therefore, description of these steps is omitted.

In the foregoing manner, in the case that the operation input, and specifically, the first operation input to the first input unit 70A is performed in response to the lane change proposal into the lane 78L located on the left side of the host vehicle lane 78C, the lane change may be carried out. Further, in the case that the operation input, and specifically, the second operation input to the second input unit 70B is performed in response to the lane change proposal into the lane 78L located on the left side of the host vehicle lane 78C, the lane change may not be carried out. Further, in the case that the operation input, and specifically, the first operation input to the first input unit 70A is performed in response to the lane change proposal into the lane 78R located on the right side of the host vehicle lane 78C, the lane change may not be carried out. Further, in the case that the operation input, and specifically, the second operation input to the second input unit 70B is performed in response to the lane change proposal into the lane 78R located on the right side of the host vehicle lane 78C, the lane change may be carried out.

Second Embodiment

Figure 14:
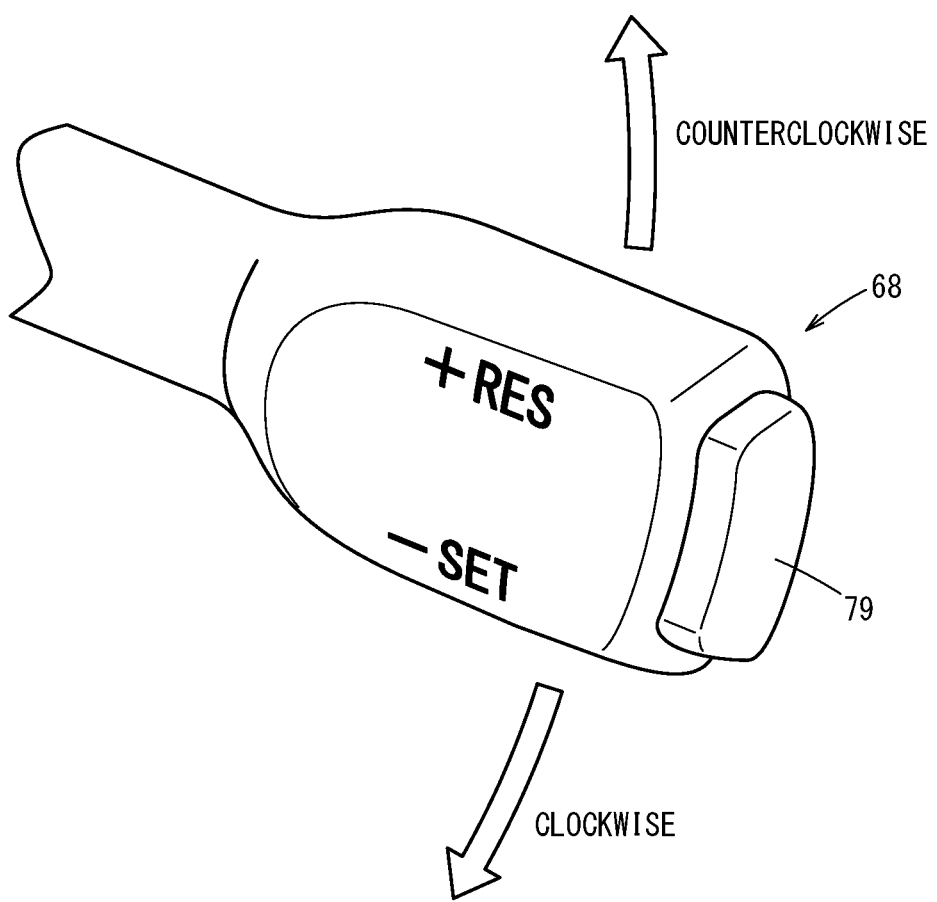
FIG. 14 is a perspective view showing an operation input unit provided in a vehicle according to a second embodiment.
Figure 15:
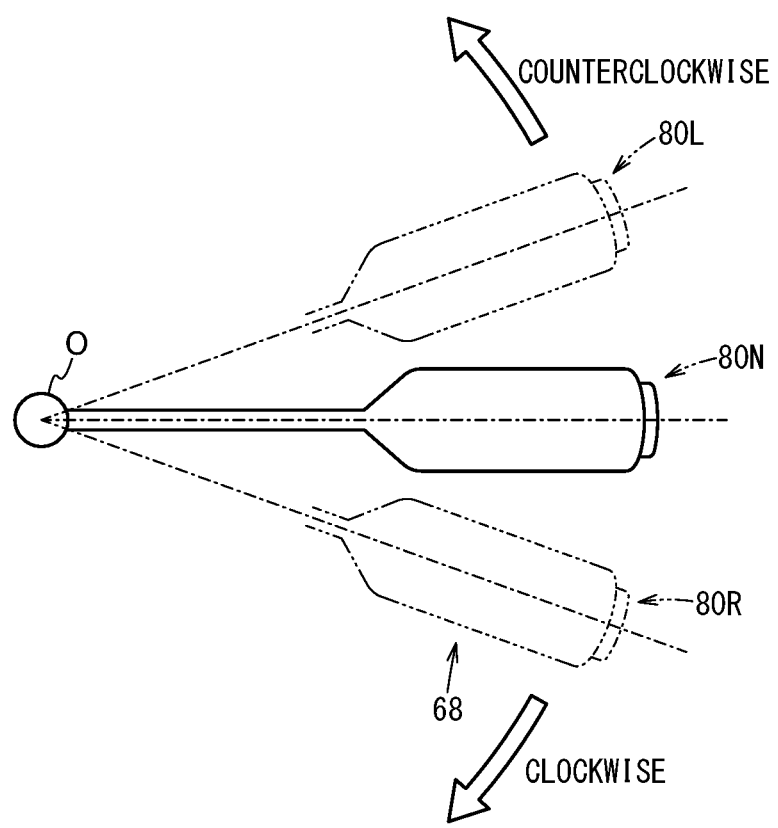
FIG. 15 is a diagram illustrating the operation input unit provided in the vehicle according to the second embodiment.

A vehicle control device, a vehicle, and a vehicle control method according to a second embodiment will be described with reference to the drawings. FIG. 14 is a perspective view showing an operation input unit provided in the vehicle according to the present embodiment. FIG. 15 is a diagram illustrating the operation input unit provided in the vehicle according to the present embodiment. The same components as those of the vehicle control device according to the first embodiment shown in FIGS. 1 to 13 are denoted by the same reference numerals, and description of such features is either omitted or simplified.

In the present embodiment, the vehicle 10 is equipped with the operation input unit 68 as shown in FIGS. 14 and 15. The operation input unit 68 is a turnable lever-shaped operation input unit. The operation input unit 68 is provided on a non-illustrated steering column. The operation input unit 68 can be turned clockwise and counterclockwise about a non-illustrated support shaft. The operation input unit 68 can be set to a neutral position 80N, an operating position 80L, and an operating position 80R. The operating position 80L is a position turned counterclockwise from the neutral position 80N by a predetermined stroke amount. The operating position 80R is a position turned clockwise from the neutral position 80N by a predetermined stroke amount. A push button 79 is disposed at the distal end of the operation input unit 68.

The operation input unit 68 is equipped with a first switch 68A (see FIG. 1), a second switch 68B (see FIG. 1), and a third switch 68C (see FIG. 1). When the operation input unit 68 is located in the operating position 80L, or in other words, when the first operation input is performed, the first switch 68A is placed in an ON state. When the operation input unit 68 is located in the operating position 80R, or in other words, when the second operation input is performed, the second switch 68B is placed in an ON state. In this manner, the operating direction of the second operation input differs from that of the first operation input. When the push button 79 is pressed by the user, the third switch 68C is placed in an ON state. The first switch 68A, for example, is a resume switch. The second switch 68B, for example, is a set switch. The third switch 68C, for example, is a cancel switch. The operation input unit 68 supplies signals, which are indicative of operation states set with respect to the first switch 68A, the second switch 68B, and the third switch 68C, to a later-described operation detection unit 58.

The direction in which the operation input unit 68 is turned by the user when the lane change is carried out into the lane 78L located on the left side of the host vehicle lane 78C is along a direction in which the direction-indicating operation lever 75 is turned when the lane change into the lane 78L is performed by steering by the user. The direction in which the operation input unit 68 is turned by the user when the lane change is carried out into the lane 78R located on the right side of the host vehicle lane 78C is along a direction in which the direction-indicating operation lever 75 is turned when the lane change into the lane 78R is performed by steering by the user. In the present embodiment, such a configuration is employed for the following reasons. More specifically, in the case that the user carries out a lane change into the lane 78L located on the left side of the host vehicle lane 78C by steering, the direction-indicating operation lever 75 is turned counterclockwise. Accordingly, when the lane change is instructed into the lane 78L located on the left side of the host vehicle lane 78C, turning of the operation input unit 68 in a counterclockwise direction is easy for the user to imagine intuitively. On the other hand, in the case that the user carries out the lane change into the lane 78R located on the right side of the host vehicle lane 78C by steering, the direction-indicating operation lever 75 is turned clockwise. Accordingly, when the lane change is instructed into the lane 78R located on the right side of the host vehicle lane 78C, turning of the operation input unit 68 in a clockwise direction is easy for the user to imagine intuitively. In accordance with such reasoning, the present embodiment is configured in the manner described above.

In the foregoing manner, according to the present embodiment, the vehicle 10 is equipped with the turnable lever-shaped operation input unit 68. The direction in which the operation input unit 68 is turned by the user when the lane change is carried out into the lane 78L located on the left side of the host vehicle lane 78C is along a direction in which the direction-indicating operation lever 75 is turned when the lane change into the lane 78L is performed by steering by the user. The direction in which the operation input unit 68 is turned by the user when the lane change is carried out into the lane 78R located on the right side of the host vehicle lane 78C is along a direction in which the direction-indicating operation lever 75 is turned when the lane change into the lane 78R is performed by steering by the user. Therefore, according to the present embodiment as well, it is possible for the vehicle control device 12 having suitable operability to be provided.

Modified Embodiments

Although preferred embodiments of the present invention have been described above, the present invention is not limited to the above-described embodiments, and various modifications can be made thereto without departing from the essence and scope of the present invention.

For example, according to the first embodiment, although an exemplary case has been described in which the upper portion within the ring-shaped push button 70 is the first input unit 70A, and the lower portion of the ring-shaped push button 70 is the second input unit 70B, the present invention is not limited to this feature. The push button that constitutes the first input unit 70A, and the push button that constitutes the second input unit 70B may be provided separately from each other. Even in such a case, the first operation input and the second operation input, which have operating positions that differ from each other, can be performed.

Summarizing the embodiments described above, the following features and advantages are realized.

The vehicle control device (12) comprises the operation detection unit (58) which detects the operation input performed by the user to the operation input unit (68), which is capable of being used when increasing or decreasing the travel speed of the host vehicle (10), when initiating a following control with respect to the preceding vehicle (76), or when reinitiating the following control with respect to the preceding vehicle, and a lane change control unit (62) that carries out the lane change control on the basis of the operation input detected by the operation detection unit, wherein the first operation input and the second operation input can be performed to the operation input unit, the second operation input being performed in a different operating position or in a different operating direction from the first operation input, and in the case that the first operation input is performed, the lane change control unit carries out the lane change into the first lane (78L) located on one side of the host vehicle lane which is the lane in which the host vehicle is traveling, whereas in the case that the second operation input is performed, the lane change control unit carries out the lane change into the second lane (78R) located on the other side of the host vehicle lane. In accordance with such a configuration, an instruction for the lane change can be issued using the operation input unit, which is capable of being used when increasing or decreasing the travel speed of the host vehicle, when initiating the following control with respect to the preceding vehicle, or when reinitiating the following control with respect to the preceding vehicle. Thus, in accordance with such a configuration, it is possible for the vehicle control device having suitable operability to be provided.

The lane change control unit may carry out the lane change on the basis of the operation input being made to the operation input unit for the predetermined time period or longer. In accordance with such a configuration, since the lane change is carried out only in the case that the operation input is greater than or equal to the predetermined time period, it is possible to contribute to the prevention of erroneous operations.

The above-described vehicle control device may further comprise the speed setting unit (60) that sets the travel speed of the host vehicle on the basis of the operation input, wherein, in the case that the operation input is performed after setting of the travel speed by the speed setting unit has been completed, the lane change control unit may carry out the lane change control on the basis of the operation input. In accordance with such a configuration, before setting of the travel speed by the speed setting unit has been completed, the operation input unit can be used in order to increase or decrease the travel speed.

In the case that the operation input is performed after setting of the travel speed by the speed setting unit has been completed, and after traveling of the host vehicle at the set travel speed has been performed for greater than or equal to the distance threshold value or greater than or equal to the time threshold value, the lane change control unit may carry out the lane change control on the basis of the operation input. In accordance with such a configuration, since the lane change on the basis of the operation input is carried out after traveling of the host vehicle at the set travel speed has been performed for greater than or equal to the distance threshold value or greater than or equal to the time threshold value, it is possible to contribute to an improvement in safety.

The above-described vehicle control device may include an automatic setting mode in which the travel speed of the host vehicle is automatically set, and a manual setting mode in which the travel speed of the host vehicle is manually set, in the case that the operation input is performed in the automatic setting mode, the lane change control may be carried out by the lane change control unit on the basis of the operation input, and in the case that the operation input is performed in the manual setting mode, setting of the travel speed of the host vehicle may be carried out by the speed setting unit on the basis of the operation input. In accordance with such a configuration, in the automatic setting mode, the operation input unit can be used in order to instruct the lane change, and in the manual setting mode, the operation input unit can be used in order to increase or decrease the travel speed.

The operation input unit may be provided on the steering wheel (74). In accordance with such a configuration, since the lane change can be instructed using the operation input unit that is provided on the steering wheel, suitable operability can be achieved.

The operation input unit may comprise the first input unit (70A), and the second input unit (70B) that differs from the first input unit, the first operation input may be an operation input to the first input unit, the second operation input may be an operation input to the second input unit, the direction from the second input unit toward the first input unit may be along a direction in which the direction-indicating operation lever (75) is turned by the user when the lane change into the first lane is performed by steering by the user, and the direction from the first input unit toward the second input unit may be along a direction in which the direction-indicating operation lever is turned by the user when the lane change into the second lane is performed by steering by the user. In the case that the user carries out a lane change into the lane located on the left side of the host vehicle lane by steering, the distal end of the direction-indicating operation lever is moved upward by the user, in a manner so as to cause the direction-indicating operation lever to turn counterclockwise. Accordingly, when the lane change is instructed into the lane located on the left side of the host vehicle lane, pressing of the first input unit, which is located on an upper side of the second input unit, is easy for the user to imagine intuitively. On the other hand, in the case that the user carries out a lane change into the lane located on the right side of the host vehicle lane by steering, the distal end of the direction-indicating operation lever is moved downward by the user, in a manner so as to cause the direction-indicating operation lever to turn clockwise. Accordingly, when the lane change is instructed into the lane located on the right side of the host vehicle lane, pressing of the second input unit, which is located on a lower side of the first input unit, is easy for the user to imagine intuitively. Thus, in accordance with such a configuration, it is possible for the vehicle control device having suitable operability to be provided.

The above-described vehicle control device may include the first driving control state in which the user is required to be grasping the steering wheel, and the second driving control state in which the user is not required to be grasping the steering wheel, and in the first driving control state, the lane change control unit may carry out the lane change control on the basis of the operation input, and in the second driving control state, the lane change control unit may be operated so as not to carry out the lane change on the basis of the operation input. In accordance with such a configuration, in the second driving control state in which the user is not required to be grasping the steering wheel, since it is impossible to issue an instruction for the lane change using the operation input unit, it is possible to contribute to an improvement in safety.

In the case that the user is grasping the steering wheel, the lane change control unit may carry out the lane change control on the basis of the operation input, whereas in the case that the user is not grasping the steering wheel, the lane change control unit may be operated so as not to carry out the lane change on the basis of the operation input. Since it is not easy in all cases for the user to operate the operation input unit accurately in a state in which the user is not grasping the steering wheel, in accordance with such a configuration, it is possible to realize an improvement in safety. On the other hand, in a state in which the user is grasping the steering wheel, the user is able to accurately operate the operation input unit, and therefore, in accordance with such a configuration, it is possible to realize favorable operability while safety is ensured.

In the case that the angle of rotation of the steering wheel is less than a predetermined angle with respect to the neutral position, the lane change control unit may carry out the lane change on the basis of the operation input, whereas in the case that the angle of rotation of the steering wheel is greater than or equal to the predetermined angle with respect to the neutral position, the lane change control unit may be operated so as not to carry out the lane change on the basis of the operation input. In accordance with such a configuration, in the case that the angle of rotation of the steering wheel is greater than or equal to the predetermined angle with respect to the neutral position, an instruction for the lane change cannot be issued using the operation input unit, and therefore, it is possible to contribute to the prevention of erroneous operations.

The operation input unit may be a turnable lever-shaped operation input unit, the direction in which the operation input unit is turned by the user when the lane change into the first lane is carried out may be along a direction in which the direction-indicating operation lever is turned by the user when the lane change into the first lane is performed by steering by the user, and the direction in which the operation input unit is turned by the user when the lane change into the second lane is carried out may be along a direction in which the direction-indicating operation lever is turned by the user when the lane change into the second lane is performed by steering by the user. In the case that the user carries out a lane change into the lane located on the left side of the host vehicle lane by steering, the direction-indicating operation lever is turned counterclockwise. Accordingly, when the lane change is instructed into the lane located on the left side of the host vehicle lane, turning of the operation input unit in a counterclockwise direction is easy for the user to imagine intuitively. On the other hand, in the case that the user carries out the lane change into the lane located on the right side of the host vehicle lane by steering, the direction-indicating operation lever is turned clockwise. Accordingly, when the lane change is instructed into the lane located on the right side of the host vehicle lane, turning of the operation input unit in a clockwise direction is easy for the user to imagine intuitively. Thus, in accordance with such a configuration, it is possible for the vehicle control device having suitable operability to be provided.

The above-described vehicle control device may further comprise the lane change proposal unit (64) that issues a lane change proposal to the user, wherein, in the case that the operation input is performed in response to the lane change proposal issued by the lane change proposal unit, the lane change control unit may carry out the lane change on the basis of the operation input.

The above-described vehicle control device may further comprise the lane change proposal unit that issues a lane change proposal to the user, wherein, in the case that one of the first operation input and the second operation input is performed in response to the lane change proposal into a lane on one side issued by the lane change proposal unit, the lane change control unit may carry out the lane change into the lane on the one side, whereas in the case that another of the first operation input and the second operation input is performed in response to the lane change proposal into the lane on the one side issued by the lane change proposal unit, the lane change control unit may be operated so as not to carry out the lane change into the lane on the one side.

The vehicle (10) comprises the vehicle control device as described above.

The vehicle control method includes the step of detecting the operation input performed by the user to the operation input unit, which is capable of being used when increasing or decreasing a travel speed of a host vehicle, when initiating a following control with respect to a preceding vehicle, or when reinitiating the following control with respect to the preceding vehicle, and the step of carrying out the lane change control on the basis of the operation input, wherein the first operation input and the second operation input can be performed to the operation input unit, the second operation input being performed in a different operating position or in a different operating direction from the first operation input, and in the step of carrying out the lane change control, in the case that the first operation input is performed, the lane change is carried out into a first lane located on one side of the host vehicle lane which is the lane in which the host vehicle is traveling, whereas in the case that the second operation input is performed, the lane change is carried out into the second lane located on another side of the host vehicle lane.

What is claimed is:

1. A vehicle control device, comprising one or more processors that execute computer-executable instructions stored in a memory, wherein the one or more processors execute the computer-executable instructions to cause the vehicle control device to:

detect an operation input performed by a user to an operation input unit configured to be used when increasing or decreasing a travel speed of a host vehicle, when initiating a following control with respect to a preceding vehicle, or when reinitiating the following control with respect to the preceding vehicle; and carry out a lane change control on a basis of the operation input detected, wherein a first operation input and a second operation input are configured to be performed to the operation input unit, the second operation input being performed in a different operating position or in a different operating direction from the first operation input, and in a case that the first operation input is performed to the operation input unit configured to be used when increasing or decreasing the travel speed of the host vehicle, when initiating the following control with respect to a preceding vehicle, or when reinitiating the following control with respect to the preceding vehicle, the one or more processors cause the vehicle control device to carry out the lane change into a first lane located on one side of a host vehicle lane which is a lane in which the host vehicle is traveling, whereas in a case that the second operation input is performed to the operation input unit configured to be used when increasing or decreasing the travel speed of the host vehicle, when initiating the following control with respect to a preceding vehicle, or when reinitiating the following control with respect to the preceding vehicle, the one or more processors cause the vehicle control device to carry out the lane change into a second lane located on another side of the host vehicle lane.

2. The vehicle control device according to claim 1, wherein the one or more processors cause the vehicle control device to carry out the lane change on a basis of the operation input being made to the operation input unit for a predetermined time period or longer.

3. The vehicle control device according to claim 1, further comprising a speed setting unit configured to set the travel speed of the host vehicle on the basis of the operation input, wherein, in a case that the operation input is performed after setting of the travel speed by the speed setting unit has been completed, the one or more processors cause the vehicle control device to carry out the lane change control on the basis of the operation input.

4. The vehicle control device according to claim 3, wherein, in a case that the operation input is performed after setting of the travel speed by the speed setting unit has been completed, and after traveling of the host vehicle at the set travel speed has been performed for greater than or equal to a distance threshold value or greater than or equal to a time threshold value, the one or more processors cause the vehicle control device to carry out the lane change control on the basis of the operation input.

5. The vehicle control device according to claim 3, wherein:
the vehicle control device includes an automatic setting mode in which the travel speed of the host vehicle is automatically set, and a manual setting mode in which the travel speed of the host vehicle is manually set;
in a case that the operation input is performed in the automatic setting mode, the one or more processors cause the vehicle control device to carry out the lane change control on the basis of the operation input; and
in a case that the operation input is performed in the manual setting mode, setting of the travel speed of the host vehicle is carried out by the speed setting unit on the basis of the operation input.

6. The vehicle control device according to claim 1, wherein the operation input unit is provided on a steering wheel.

7. The vehicle control device according to claim 6, wherein:
the operation input unit comprises a first input unit, and a second input unit that differs from the first input unit;
the first operation input is an operation input to the first input unit;
the second operation input is an operation input to the second input unit;
a direction from the second input unit toward the first input unit is along a direction in which a direction-indicating operation lever is turned by the user when the lane change into the first lane is performed by steering by the user; and a direction from the first input unit toward the second input unit is along a direction in which the direction-indicating operation lever is turned by the user when the lane change into the second lane is performed by steering by the user.

8. The vehicle control device according to claim 6, wherein:
the vehicle control device includes a first driving control state in which the user is required to be grasping the steering wheel, and a second driving control state in which the user is not required to be grasping the steering wheel; and
in the first driving control state, the one or more processors cause the vehicle control device to carry out the lane change control on the basis of the operation input, and in the second driving control state, the one or more processors do not cause the vehicle control device to carry out the lane change on the basis of the operation input.

9. The vehicle control device according to claim 6, wherein, in a case that the user is grasping the steering wheel, the one or more processors cause the vehicle control device to carry out the lane change control on the basis of the operation input, whereas in a case that the user is not grasping the steering wheel, the one or more processors do not cause the vehicle control device to carry out the lane change on the basis of the operation input.

10. The vehicle control device according to claim 6, wherein, in a case that an angle of rotation of the steering wheel is less than a predetermined angle with respect to a neutral position, the one or more processors cause the vehicle control device to carry out the lane change on the basis of the operation input, whereas in a case that the angle of rotation of the steering wheel is greater than or equal to the predetermined angle with respect to the neutral position, the one or more processors do not cause the vehicle control device to carry out the lane change on the basis of the operation input.

11. The vehicle control device according to claim 1, wherein:
the operation input unit is a turnable lever-shaped operation input unit;
a direction in which the operation input unit is turned by the user when the lane change into the first lane is carried out is along a direction in which a direction-indicating operation lever is turned by the user when the lane change into the first lane is performed by steering by the user; and
a direction in which the operation input unit is turned by the user when the lane change into the second lane is carried out is along a direction in which the direction-indicating operation lever is turned by the user when the lane change into the second lane is performed by steering by the user.

12. The vehicle control device according to claim 1, further comprising a lane change proposal unit configured to issue a proposal to make the lane change to the user, wherein, in a case that the operation input is performed in response to the proposal to make the lane change issued by the lane change proposal unit, the one or more processors cause the vehicle control device to carry out the lane change on the basis of the operation input.

13. The vehicle control device according to claim 1, further comprising a lane change proposal unit configured to issue a proposal to make the lane change to the user, wherein, in a case that one of the first operation input and the second operation input is performed in response to the proposal to make the lane change into a lane on one side issued by the lane change proposal unit, the one or more processors cause the vehicle control device to carry out the lane change into the lane on the one side, whereas in a case that another of the first operation input and the second operation input is performed in response to the proposal to make the lane change into the lane on the one side issued by the lane change proposal unit, the one or more processors do not cause the vehicle control device to carry out the lane change into the lane on the one side.

14. A vehicle comprising a vehicle control device, the vehicle control device comprising one or more processors that execute computer-executable instructions stored in a memory, wherein the one or more processors execute the computer-executable instructions to cause the vehicle control device to:

detect an operation input performed by a user to an operation input unit configured to be used when increasing or decreasing a travel speed of a host vehicle, when initiating a following control with respect to a preceding vehicle, or when reinitiating the following control with respect to the preceding vehicle; and carry out a lane change control on a basis of the operation input detected, wherein a first operation input and a second operation input are configured to be performed to the operation input unit, the second operation input being performed in a different operating position or in a different operating direction from the first operation input, and in a case that the first operation input is performed to the operation input unit configured to be used when increasing or decreasing the travel speed of the host vehicle, when initiating the following control with respect to a preceding vehicle, or when reinitiating the following control with respect to the preceding vehicle, the one or more processors cause the vehicle control device to carry out the lane change into a first lane located on one side of a host vehicle lane which is a lane in which the host vehicle is traveling, whereas in a case that the second operation input is performed to the operation input unit configured to be used when increasing or decreasing the travel speed of the host vehicle, when initiating the following control with respect to a preceding vehicle, or when reinitiating the following control with respect to the preceding vehicle, the one or more processors cause the vehicle control device to carry out the lane change into a second lane located on another side of the host vehicle lane.

15. A vehicle control method, comprising:

a step of detecting an operation input performed by a user to an operation input unit configured to be used when increasing or decreasing a travel speed of a host vehicle, when initiating a following control with respect to a preceding vehicle, or when reinitiating the following control with respect to the preceding vehicle; and a step of carrying out a lane change control on a basis of the operation input, wherein a first operation input and a second operation input are configured to be performed to the operation input unit, the second operation input being performed in a different operating position or in a different operating direction from the first operation input, and in the step of carrying out the lane change control, in a case that the first operation input is performed to the operation input unit configured to be used when increasing or decreasing the travel speed of the host vehicle, when initiating the following control with respect to a preceding vehicle, or when reinitiating the following control with respect to the preceding vehicle, the lane change is carried out into a first lane located on one side of a host vehicle lane which is a lane in which the host vehicle is traveling, whereas in a case that the second operation input is performed to the operation input unit configured to be used when increasing or decreasing the travel speed of the host vehicle, when initiating the following control with respect to a preceding vehicle, or when reinitiating the following control with respect to the preceding vehicle, the lane change is carried out into a second lane located on another side of the host vehicle lane.

* * * * *